(12) United States Patent
Shiiyama

(10) Patent No.: US 6,584,223 B1
(45) Date of Patent: Jun. 24, 2003

(54) IMAGE SEARCH APPARATUS AND METHOD

(75) Inventor: Hirotaka Shiiyama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/281,783

(22) Filed: Mar. 31, 1999

(30) Foreign Application Priority Data

Apr. 2, 1998 (JP) ............................. 10-090133
Apr. 30, 1998 (JP) ............................. 10-121064

(51) Int. Cl.⁷ ............................ G06K 9/34; G06K 9/46; G06K 9/68
(52) U.S. Cl. ................... 382/173; 382/190; 382/180; 382/192; 382/218; 382/219
(58) Field of Search ............................. 382/164, 173, 382/180, 190, 192, 195, 203, 205, 209, 215, 218, 219, 305, 227, 306; 358/403; 707/3, 6

(56) References Cited

U.S. PATENT DOCUMENTS

| 5,689,585 | A | 11/1997 | Bloomberg et al. | |
|---|---|---|---|---|
| 6,181,818 | B1 | * 1/2001 | Sato et al. | 382/170 |
| 6,246,804 | B1 | * 6/2001 | Sato et al. | 382/284 |
| 6,381,365 | B2 | * 4/2002 | Murakawa | 382/190 |

FOREIGN PATENT DOCUMENTS

| EP | 0 866 409 | 9/1998 |
|---|---|---|
| JP | 8-241335 | 9/1996 |
| JP | 8-249349 | 9/1996 |

OTHER PUBLICATIONS

"Decoding Image Semantics Using Composite Region Templates", J.R. Smith, et al., Proceedings, IEEE Workshop on content–Based Access of Image and Video Libraries (CAT No. 98EX173), Santa Barbara, CA, pp 9–13, Jun. 21, 1998.
"An Image Database System with Fast Image Indexing Capability Based on Color Histograms", G. Yihong, et al., Proceedings of the Region 10 Annual International Conference (TENCON) IEEE, vol. CONF. 9, pp 407–411, Aug. 22, 1994.
U.S. Ser. No. 08/972,433, Filed Nov. 18, 1997, now pending.

* cited by examiner

Primary Examiner—Phuoc Tran
Assistant Examiner—Amir Alavi
(74) Attorney, Agent, or Firm—Fitzpatrick, Cella, Harper & Scinto

(57) ABSTRACT

An image feature amount extraction unit and feature amount label matrix generation unit generate a label sequence from image data. An image management DB stores image data stored in an image storage unit and label sequences corresponding to the image data in correspondence with each other. A label sequence index registers, in units of labels, image data including the labels and the numbers of labels included in those image data. Upon search, a pattern matching unit extracts label sequences which are similar to the label sequence of a query image to some extent from the label sequence index, computes similarities between the extracted label sequences, and the label sequence of the query image, and outputs images, in which the computed similarities exceed a predetermined value, as search results.

72 Claims, 27 Drawing Sheets

FIG.3

| IMAGE ID (111) | IMAGE DATA (112) |
|---|---|
| | |
| | |
| | |
| ⋮ | ⋮ |

FIG.7A

| 1 | 2 | 4 |
|---|---|---|
| 3 | 5 | 7 |
| 6 | 8 | 9 |

FIG.7B

| 1 | 3 | 6 |
|---|---|---|
| 2 | 5 | 8 |
| 4 | 7 | 9 |

FIG.7C

| 4 | 2 | 1 |
|---|---|---|
| 7 | 5 | 3 |
| 9 | 8 | 6 |

FIG.8

| IMAGE ID | FULL-PATH FILE NAME | LABEL SEQUENCE | OTHER IMAGE ATTRIBUTE |

FIG.11

|   | 1 | 2 | 3 | 4 | 5 | 6 | 7 | 8 | · · · · |
|---|---|---|---|---|---|---|---|---|---|
| 1 | 0 | 1 | 1 | 5 | 1 | 5 | 7 | 7 | · · · · |
| 2 |   | 0 | 2 | 1 | 1 | 7 | 2 | 5 | · · · · |
| 3 |   |   | 0 | 7 | 1 | 1 | 5 | 2 | · · · · |
| 4 |   |   |   | 0 | 1 | 9 | 1 | 7 | · · · · |
| ⋮ |   |   |   |   |   |   |   |   |   |

FIG.12

| SIMILARITY QUERY IMAGE | 1 | 1 | 2 | 3 | 1 | 3 | 4 | 4 | 1 |
|---|---|---|---|---|---|---|---|---|---|
| SIMILARITY COMPARISON TARGET IMAGE | 1 | 1 | 3 | 2 | 2 | 4 | 4 | 5 | 2 |

FIG.16

| IMAGE ID | FULL-PATH FILE NAME | LABEL MATRIX | OTHER IMAGE ATTRIBUTE |
|---|---|---|---|

FIG.18A

| 1 | 2 | 3 |
|---|---|---|
| 4 | 5 | 6 |
| 7 | 8 | 9 |

FIG.18B

| 3 | 2 | 1 |
|---|---|---|
| 6 | 5 | 4 |
| 9 | 8 | 7 |

FIG.18C

| 7 | 8 | 9 |
|---|---|---|
| 4 | 5 | 6 |
| 1 | 2 | 3 |

FIG.18D

| 9 | 8 | 7 |
|---|---|---|
| 6 | 5 | 4 |
| 3 | 2 | 1 |

FIG.18E

| 1 | 2 | 3 | 4 |
|---|---|---|---|
| 9 | 10 | 11 | 12 |
| 5 | 6 | 7 | 8 |
| 13 | 14 | 15 | 16 |

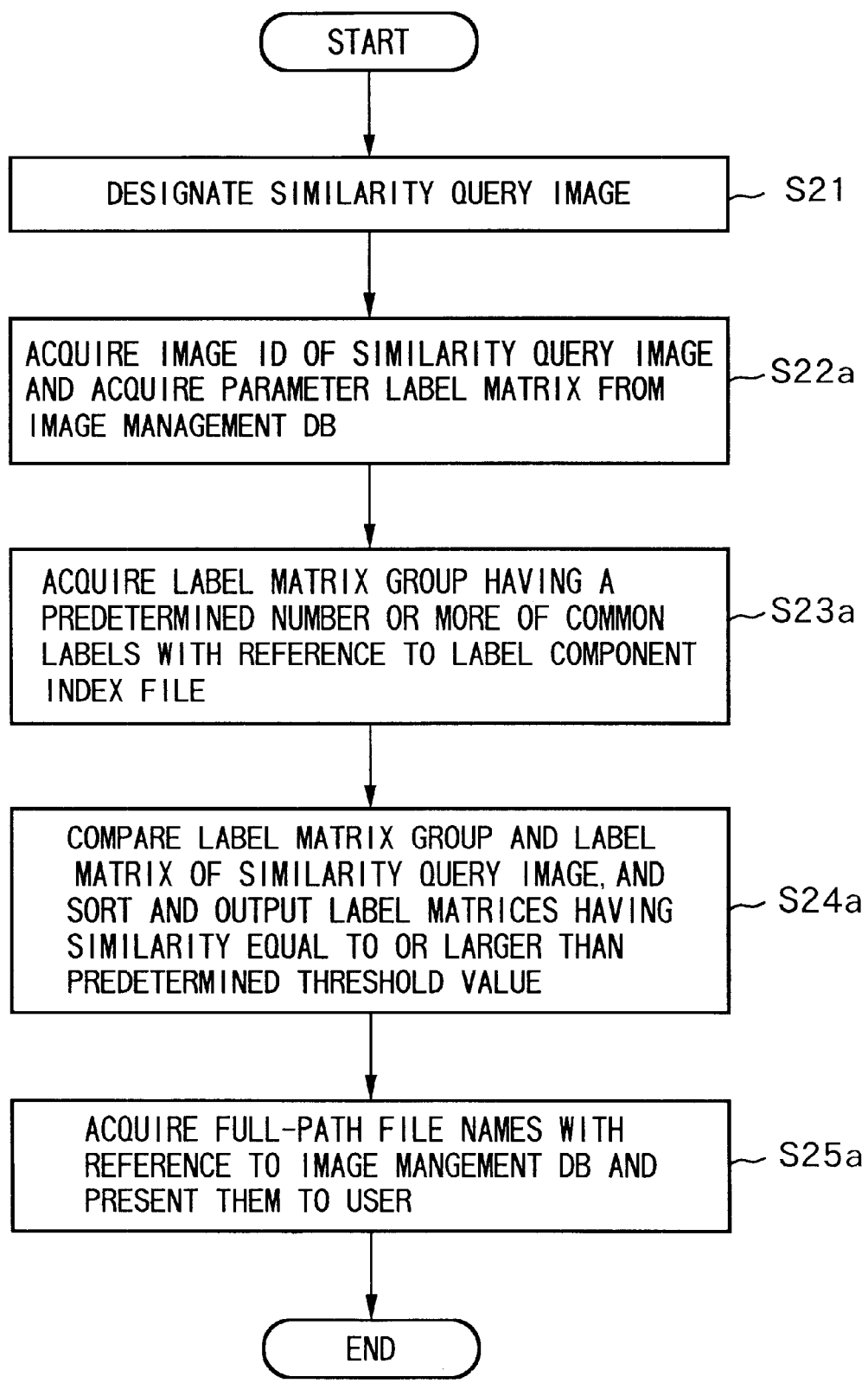

FIG.20A

| a | b | c |
|---|---|---|
| d | e | f |
| g | h | i |

FIRST ROW
SECOND ROW
THIRD ROW

SIMILARITY COMPARISON TARGET IMAGE

FIG.20B

| 1 | 2 | 3 |
|---|---|---|
| 4 | 5 | 6 |
| 7 | 8 | 9 |

SIMILARITY QUERY IMAGE

FIG.20C

| ! | 1 | 2 |
|---|---|---|

SIMILAR LINE MATRIX

FIG.25

| IMAGE ID | FULL-PATH FILE NAME | HISTOGRAM INFORMATION | OTHER IMAGE ATTRIBUTE |
|---|---|---|---|

⋮

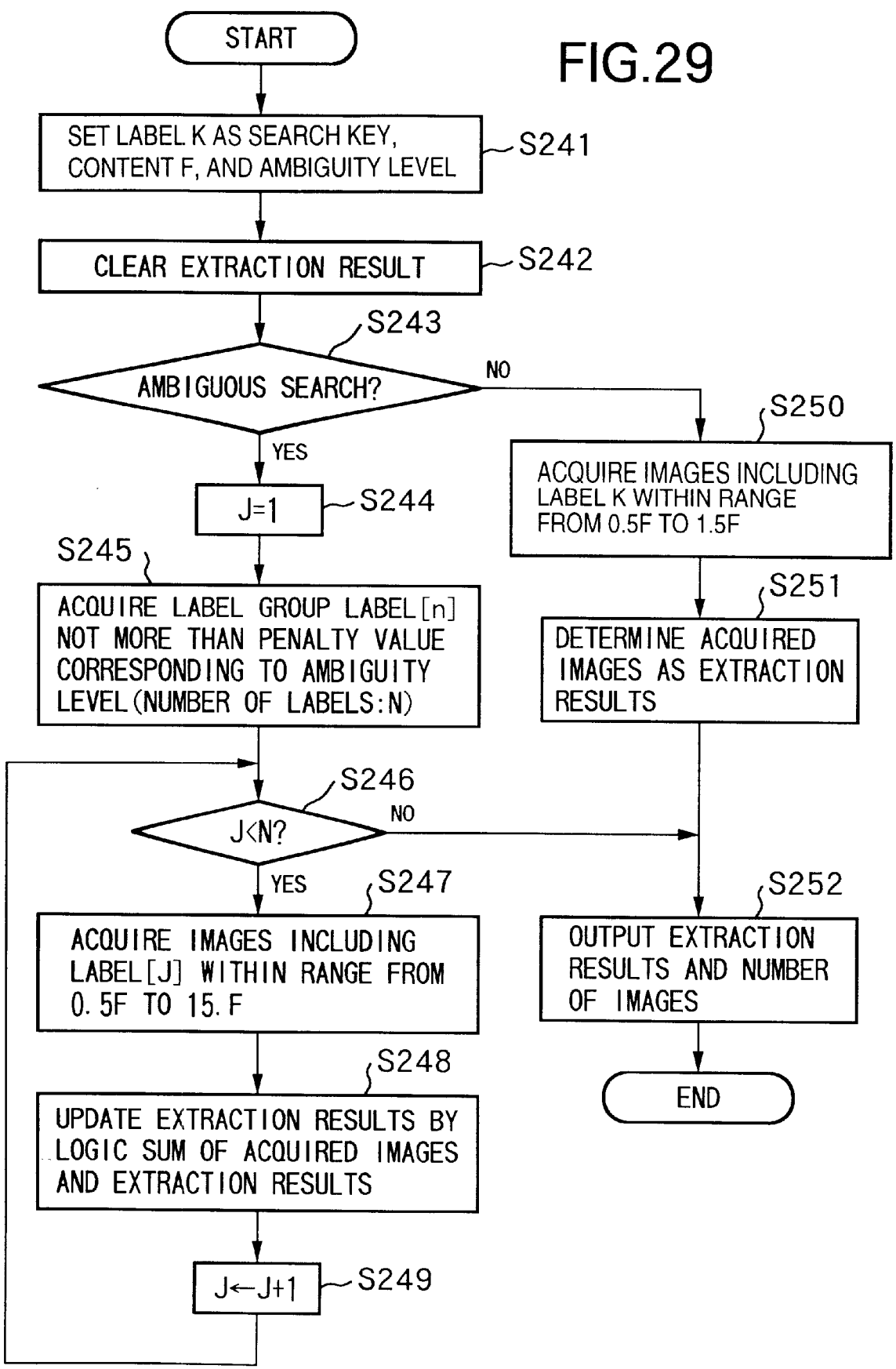

IMAGE SEARCH APPARATUS AND METHOD

BACKGROUND OF THE INVENTION

The present invention relates to an image search apparatus and method for searching for an image.

Conventionally, various techniques for searching for a similar image have been proposed. Similar image search techniques for a natural image, which have nearly reached a practical level, often use color information as an image feature amount. Most of techniques compute a histogram that pertains to color information and conduct a search using the RGB ratio or a combination of colors that frequently appear in an image.

However, in the conventional technique, since the position information of color is lost, search precision is not always high. For example, Japanese Laid-Open Patent No. 8-249349 discloses pattern matching using feature amounts (representative colors) of a plurality of blocks obtained by segmenting an image. However, in this technique, the distance between the feature amounts of two image blocks to be matched must be computed, resulting in a huge computation volume. When a representative color is used as a feature amount, three, i.e., R, G, and B data must be processed, thus further complicating computations. Also, since comparison is made using the feature amount itself, high comparison precision can be obtained but a similar image cannot be obtained by a search even due to a change in angle of an image or a change in position of an object. In other words, a so-called robust similar image search that appropriately obtains an image by a search with some ambiguity that can absorb a change in image angle or object position, some image feature amount difference depending on image sensing conditions, and the like, cannot be made.

Therefore, in order to search natural images, it is a common practice to assign keywords to images, and to perform an image search using the keywords. However, this keyword assignment requires much labor. Furthermore, images which have no keywords must be presented as thumbnail images and must be selected manually, thus complicating search operation.

As described above, a similar image search system, which searches natural images and has nearly reached a practical level, uses color information as an image feature amount. Most of such systems compute the RGB ratio or combinations of colors that frequently appear in an image by computing a histogram (to be referred to as a color histogram hereinafter) that pertains to color information, and conduct a search using them as feature amounts. In such search process, it is a common practice to make an inner product computation of the color histogram as comparison means.

However, the volume of inner product computation of the color histogram increases in proportion to the number of registered images, and when a large number of images have been registered, a long search process time is required.

Irrespective of the search technique used, the search time normally increases as the number of registered images increases. Especially, in the aforementioned similar image search, one-to-one comparison must be made between a query image as an example image and a large number of registered images to determine similarities. For this reason, the number of images to be compared (i.e., the number of registered images) has a large influence on the search time.

SUMMARY OF THE INVENTION

The present invention has been made in consideration of the above problems, and has as its object to narrow down images that must undergo similarity computations with a query image to fewer images at high speed, and implement a high-speed similar image search.

It is another object of the present invention to attain a high-speed similar image search that takes the layout of image feature amounts into consideration.

It is still another object of the present invention to attain a similar image search that can search for a similar image in consideration of the layout of image feature amounts and can absorb differences due to variations of image sensing conditions and the like.

It is still another object of the present invention to achieve a quick similar image search by reducing the similarity computation volume by computing similarity between images in such a manner that a feature amount group is expressed by a single label, and an image is expressed by a label sequence or matrix.

It is still another object of the present invention to greatly improve the processing speed of an image search process using labels by appropriately managing a label sequence or matrix.

It is still another object of the present invention to attain a more effective similar image search using a method that permits certain ambiguity as to label position such as DP matching, fuzzy nondeterministic automaton, or the like upon determining similarity between a query image and an image to be compared by comparing label sequences or matrices.

It is still another object of the present invention to provide an image search apparatus or method which can attain a high-speed image search (or narrowing down) prior to or in place of an inner product computation of a color histogram.

It is still another object of the present invention to reduce the number of images to a value that the system can process by making a high-speed presearch using an index file.

It is still another object of the present invention to allow narrowing down in consideration of the ambiguity level of a search designated by the user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 3 is a view for explaining the storage state of image data in an image storage unit 17;

FIGS. 7A to 7C are views for explaining examples of the block orders upon generating a label sequence;

FIG. 8 is a view for explaining the storage format of image data by an image management database in the first embodiment;

FIG. 11 is a view showing an example of a penalty matrix among labels used upon obtaining a similarity by comparing label sequences;

FIG. 12 is a view for explaining the distance computation between the label sequences using DP matching;

FIG. 16 is a view for explaining the storage format of image data by an image management database in the second embodiment;

FIGS. 18A to 18E are views for explaining examples of the block orders upon generating a label matrix in the second embodiment;

FIG. 19 is a flow chart for explaining the processing sequence of a similar image search according to the second embodiment;

FIGS. 20A to 20C are views for explaining a similarly computation process according to the second embodiment;

FIG. 25 is a view showing an example of the data format of storage data in an image management database in the third embodiment;

FIG. 29 is a flow chart for explaining the sequence of image extraction in accordance with ambiguity in the presearch of the third embodiment.

DETAILED DESCRIPTION OF THE PREFERRED EMBODIMENTS

Preferred embodiments of the present invention will now be described in detail in accordance with the accompanying drawings.

First Embodiment

Figure 1:
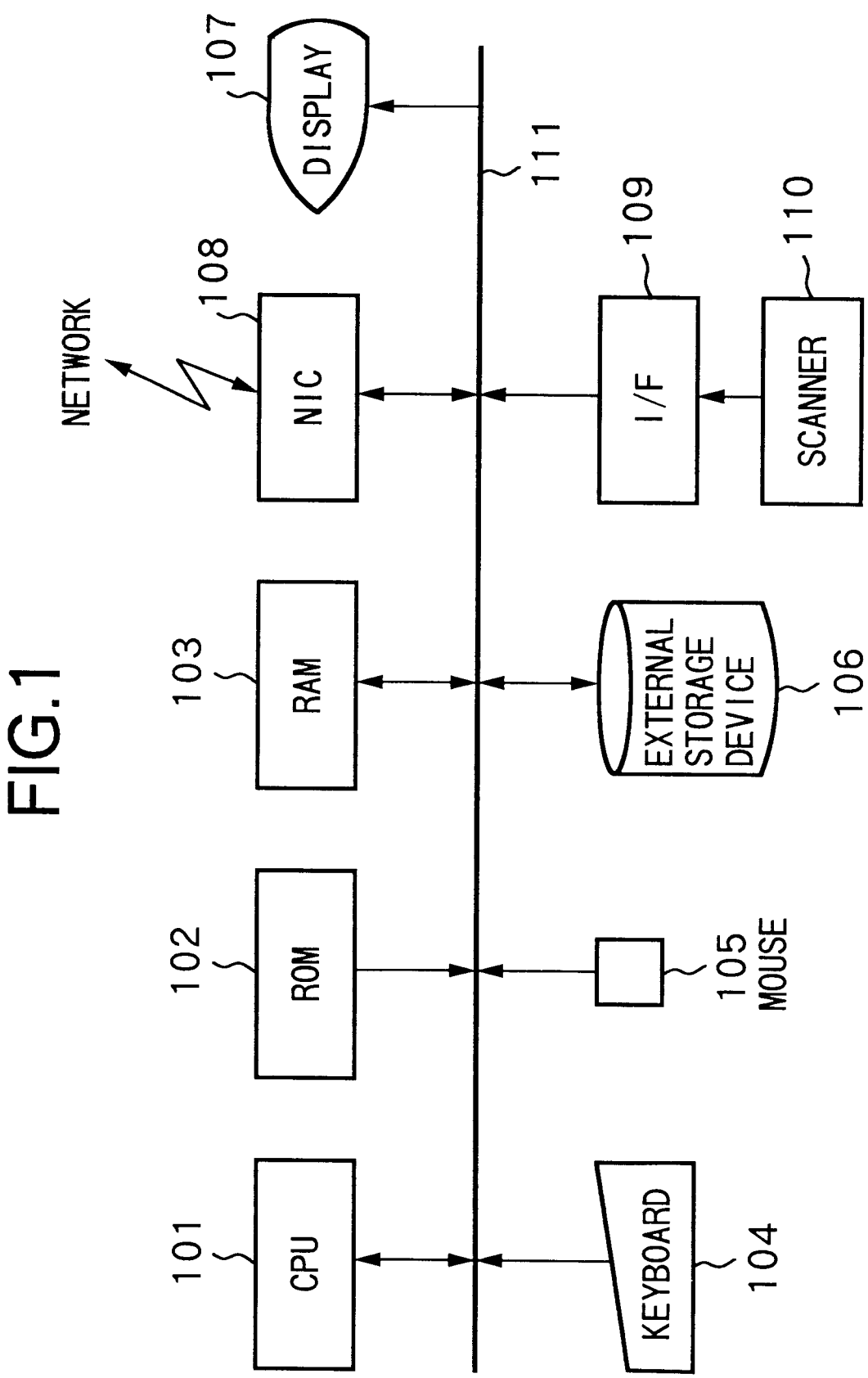
FIG. 1 is a block diagram showing the control arrangement of an image search apparatus according to the first embodiment of the present invention.

FIG. 1 is a block diagram showing the control arrangement of an image search apparatus according to the first embodiment. Referring to FIG. 1, reference numeral 101 denotes a CPU for executing various kinds of control in the image search apparatus of this embodiment. Reference numeral 102 denotes a ROM which stores a boot program executed upon starting up this apparatus, and various data. Reference numeral 103 denotes a RAM which stores a control program processed by the CPU 101, and provides a work area used by the CPU 101 upon executing various kinds of control. Reference numeral 104 denotes a keyboard; and 105, a mouse, which provide various input operation environments to the user.

Reference numeral 106 denotes an external storage device which is comprised of a hard disk, floppy disk, CD-ROM, or the like. Reference numeral 107 denotes a display which makes various kinds of display under the control of the CPU 101. Reference numeral 108 denotes a network interface which allows communications with devices on the network. Reference numeral 109 denotes an interface; and 110, a scanner for capturing an image. Reference numeral 111 denotes a bus for connecting the aforementioned units. Note that the control program that implements the processes shown in the flow charts to be described later may be stored in the ROM 102 or may be loaded from the external storage device 106 to the RAM 103.

Note that the scanner 110 and external storage device 106 in the above arrangement may be located on the network.

Figure 2:
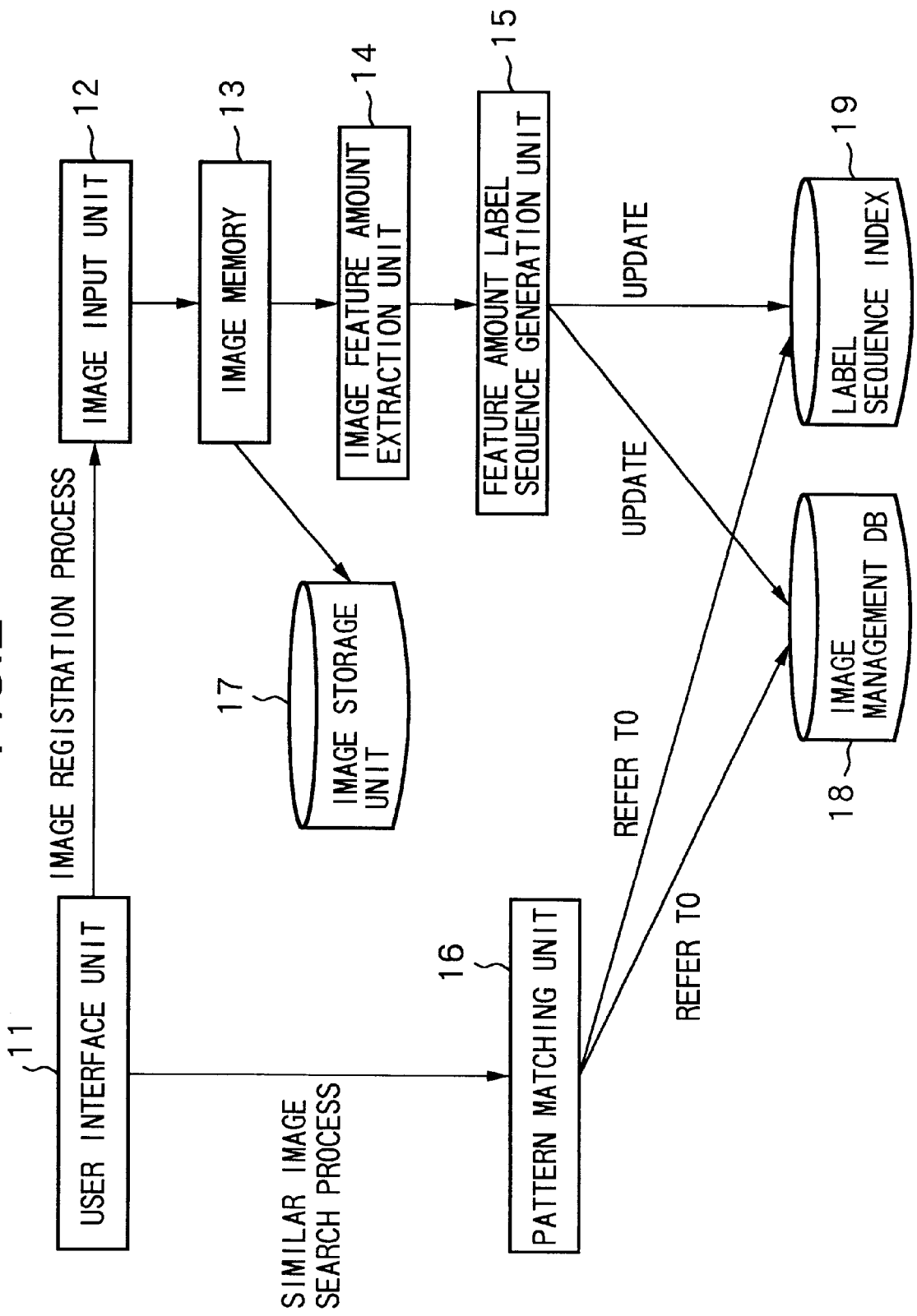
FIG. 2 is a block diagram showing the functional arrangement of the image search apparatus of the first embodiment.

FIG. 2 is a block diagram showing the functional arrangement of the image search apparatus of the first embodiment. Referring to FIG. 2, reference numeral 11 denotes a user interface unit, which detects various operation inputs from the user using the display 107, keyboard 104, and mouse 105. Reference numeral 12 denotes an image input unit which captures an image by the scanner 110. Reference numeral 13 denotes an image memory which stores image data obtained by the image input unit 12 in a predetermined area on the RAM 103. Reference numeral 14 denotes an image feature amount extraction unit which extracts a feature amount from an image stored in the image memory 13 in a sequence to be described later. Reference numeral 15 denotes a feature amount label sequence generation unit for generating a label sequence on the basis of feature amounts obtained by the image feature amount extraction unit 14. Reference numeral 16 denotes a pattern matching unit that searches for a similar image by computing similarities between an image designated or submitted as an example image and images stored in an image storage unit 17 on the basis of their label sequences.

Figure 3:
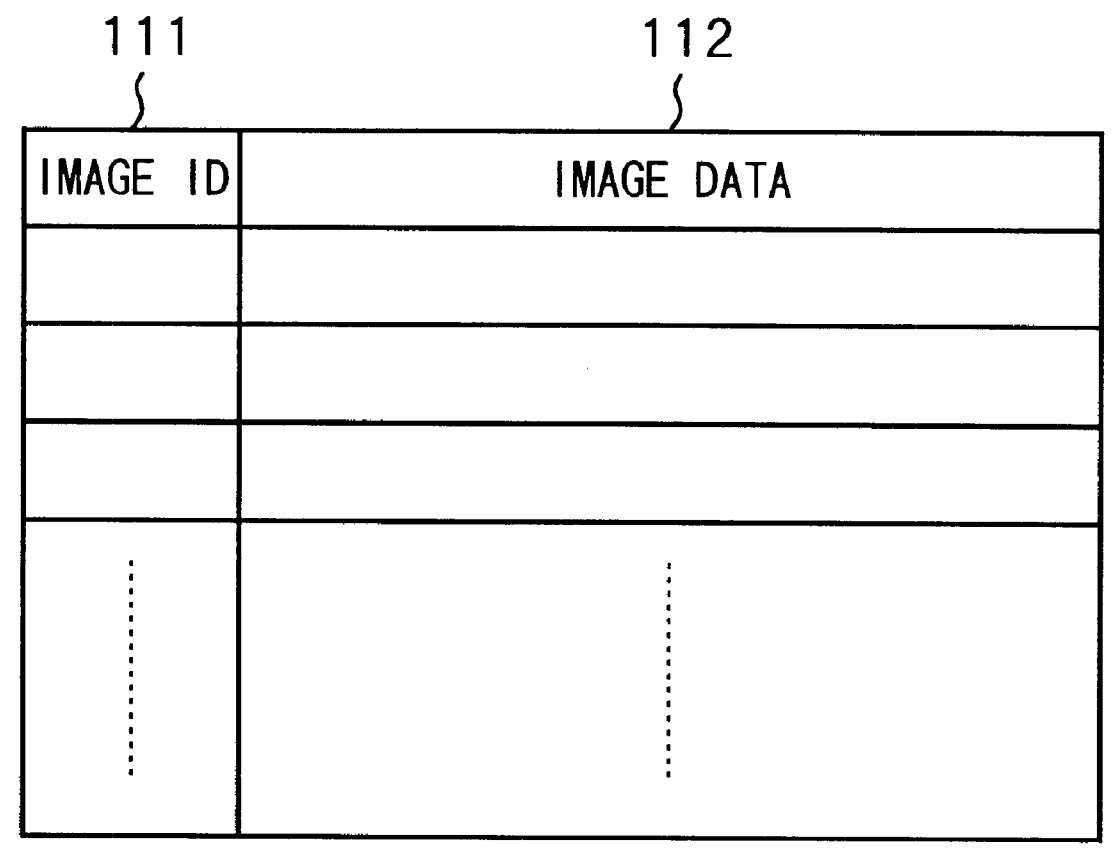

Reference numeral 17 denotes the image storage unit which stores image data obtained by the image input unit 12 and the like. FIG. 3 is a view for explaining the storage state of image data in the image storage unit 17. Each image data 112 is assigned an image ID 111, and the image storage unit 17 stores them as a pair. Reference numeral 18 denotes an image management database (to be referred to as an image management DB hereinafter) for managing image data stored in the image storage unit 17 in a data format shown in FIG. 8 (to be described later). Reference numeral 19 denotes a label sequence index which stores a label component index file shown in FIG. 10. Note that use of the label component index will be explained later with reference to the flow chart shown in FIG. 9.

An example of the operation of the image search apparatus of this embodiment with the above arrangement will be explained below. In the example to be described below, three colors, i.e., red (R), green (G), and blue (B) are used as image feature amounts that pay attention to colors, and processes in a three-dimensional color space will be explained.

Image Registration Process

Figure 4:
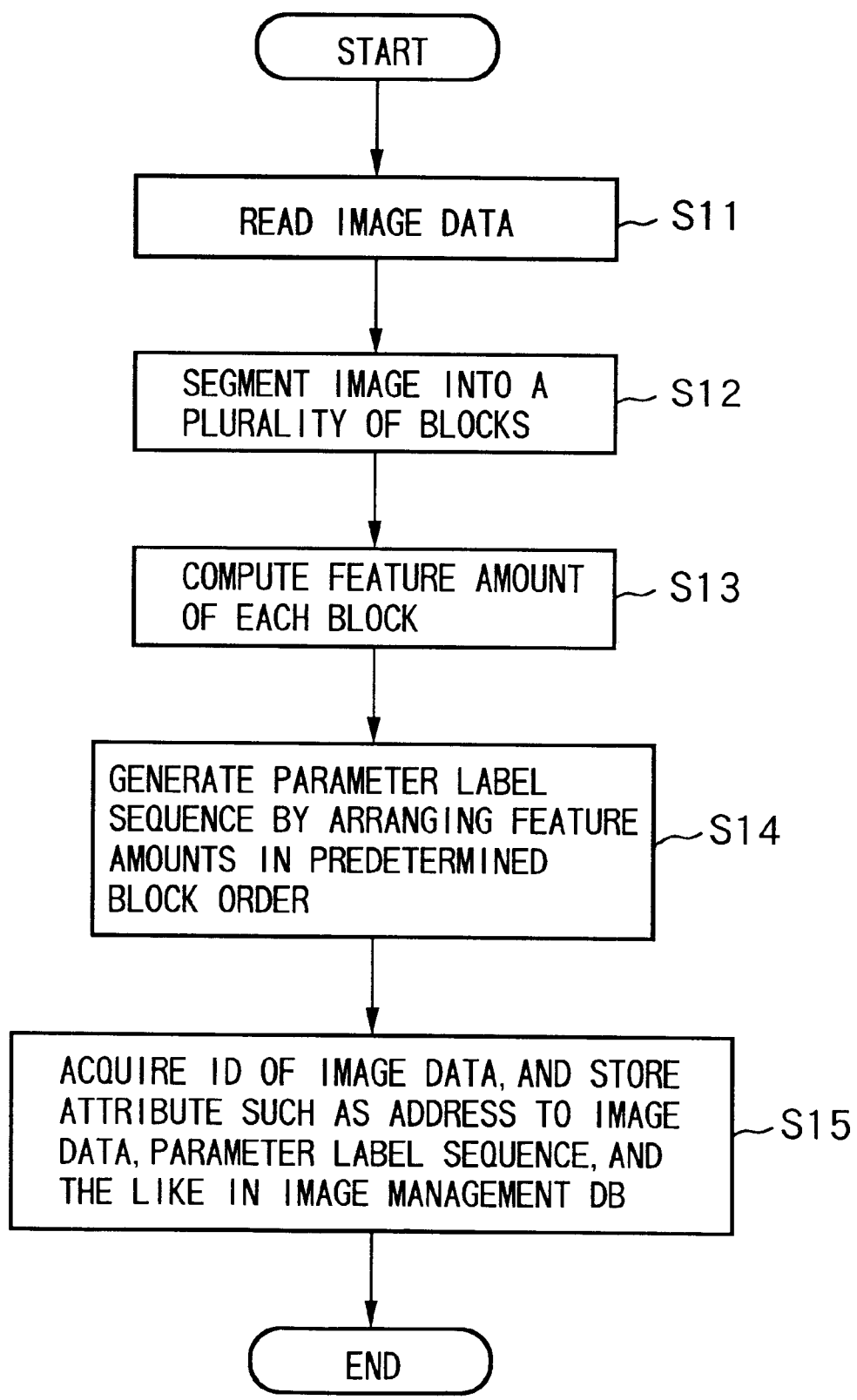
FIG. 4 is a flow chart showing the sequence of an image registration process according to the first embodiment.
Figure 5:
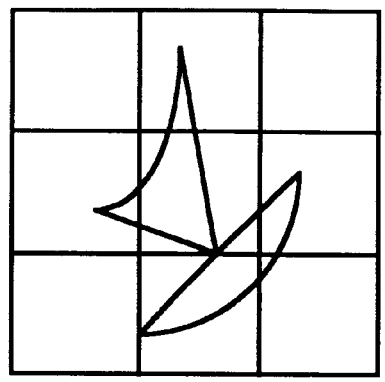
FIG. 5 is a view showing an example of an image segmented into blocks according to the first embodiment.

A process executed upon image registration will be explained first. FIG. 4 is a flow chart showing the sequence of the image registration process according to the first embodiment. In step S11, an image is captured using the image input unit 12 in accordance with a user's instruction input via the user interface unit 11, and is held in the image memory 13. In step S12, this image is segmented into a plurality of blocks. In this embodiment, an image is segmented into a plurality of blocks in the vertical and horizontal directions. FIG. 5 shows an example of an image segmented into blocks according to this embodiment. As shown in FIG. 5, in this embodiment, an image is segmented into 3×3 blocks, i.e., a total of nine blocks for the sake of simplicity. In step S13, the feature amounts of the segmented blocks are computed, and the obtained feature amounts are converted into labels.

Note that segmentation of an image into 3×3 blocks shown in FIG. 5 in this embodiment is merely for a descriptive purpose. In practice, in case of a natural image, the image is preferably segmented into 10×10 or more blocks. On the other hand, when an article is imaged on a white solid background, an image is preferably segmented into 13×13 or more blocks.

Figure 6:
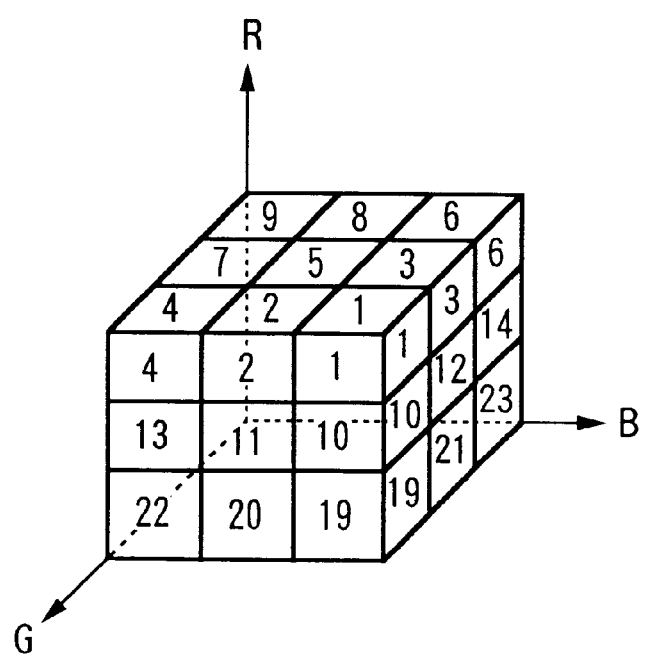
FIG. 6 is a view for explaining a multi-dimensional feature amount space according to the first embodiment.

FIG. 6 is a view for explaining a multi-dimensional feature amount space. As shown in FIG. 6, a multi-dimensional feature amount space (RGB color space) is segmented into a plurality of blocks (color blocks), i.e., cells (color cells), and unique labels are assigned to the respective cells (color cells) using serial numbers. The reason why the multi-dimensional feature amount space (RGB color space) is segmented into a plurality of blocks is to absorb delicate feature amount (color) differences.

As for the multi-dimensional feature amount space, in place of directly using image feature amounts, the respective parameters may be normalized (standardized) by obtaining the average and variance by experiments, and after that, they may undergo orthogonal transformation such as principal component analysis or the like to be transformed into a significant dimension. Note that the "significant dimension" is defined by a principal component axis with a large contribution ratio.

In step S13, the individual blocks segmented in step S12 undergo an image feature amount computation to determine the cells on the multi-dimensional feature amount space to which these blocks belong, thus obtaining corresponding labels. For example, a computation for determining color cells to which all pixels in a given segmented image block belong is made for that segmented image block, and the label of the color cell with the highest frequency is determined as a parameter label (color label) of that segmented image block. This process is done for all the blocks.

After parameter labels are assigned to the individual blocks, the parameter labels assigned to the blocks are arranged in a predetermined block order in step S14 to generate a parameter label sequence (to be referred to as a label sequence hereinafter). FIGS. 7A to 7C are views for explaining examples of the block orders upon generating a label sequence. The above-mentioned label parameters are arranged in the order of numerals in the segmented image blocks shown in each of FIGS. 7A to 7C, thus generating a label sequence.

In FIG. 7A, the segmented blocks are obliquely scanned from the upper left position toward the lower right position. This is to obtain a longest possible label sequence with a high expectation along a query object so as to reduce the influences of delicate differences and displacements of the image angles to be compared. As a result, label sequences which suffer less influences in any of the upper, lower, right, and left directions can be compared with each other in collaboration with the operation of the pattern matching unit 16 (to be described later).

Scan methods that can be applied to this embodiment are:

horizontal direction (there are four different scan methods, e.g., a scan from the left to right position that repeats itself from the upper to lower position, a scan from the left to right position that repeats itself from the lower to upper position, and the like);

vertical direction (there are four different scan methods, e.g., a scan from the upper to lower position that repeats itself from the left to right position, and the like);

oblique direction (there are a total of eight different scan methods, i.e., two oblique scans for each of the start points at the four corners including FIGS. 7A to 7C);

zigzag scans (there are a total of eight different scans, i.e., scan methods used in JPEG or the like, and two different zigzag scans for each of the start points at the four corners); and the like.

In this embodiment, the scan method to be used is determined based on the following points of view. That is, a scan method that satisfies the following conditions is used.

(1) In this embodiment, since label sequences are time-serially compared, it is not preferable that this order be reversed. Hence, all images must be scanned by a predetermined scan method to generate label sequences.

(2) Nearby blocks are preferably located nearby even in a label sequence.

(3) Easy matching is assured when the label of a block that includes the query object appears as early as possible, and it recurs over a larger number of blocks.

(4) Even when the object has moved or the angle has changed, the label positions must not be changed drastically.

Especially, assuming that most of objects of interest are located at the center of images, this embodiment uses an oblique scan as a method which allows blocks including the object of interest to appear as early as possible in the scan, and has a high expectation of scanning that object of interest over a larger number of blocks. In this embodiment, the oblique scan from the upper left to the lower right position shown in FIG. 7A is used. Of course, scan methods shown in FIGS. 7B and 7C may be used instead.

In step S15, the obtained label sequence and image data are stored in the image storage unit 17 and image management DB 18. More specifically, an image ID is acquired for the image data captured in step S11, and a pair of image ID and image data are stored in the image storage unit 17. An image management DB record shown in FIG. 8 is generated in correspondence with that image ID, and is registered in the image management DB 18.

Referring to FIG. 8, the "image ID" is a unique ID number in this system, which is acquired in step S15 in correspondence with the image of interest. A "full-path file name" is the file name of the image data of interest appended with path information indicating a drive or folder that stores the image data of interest. A "label sequence" is the one obtained in step S14. "Other image characteristics" store information indicating the presence/absence of compression of the image data of interest, compression format, and the like.

The process to be done upon image registration has been described.

Similar Image Search Process

Figure 9:
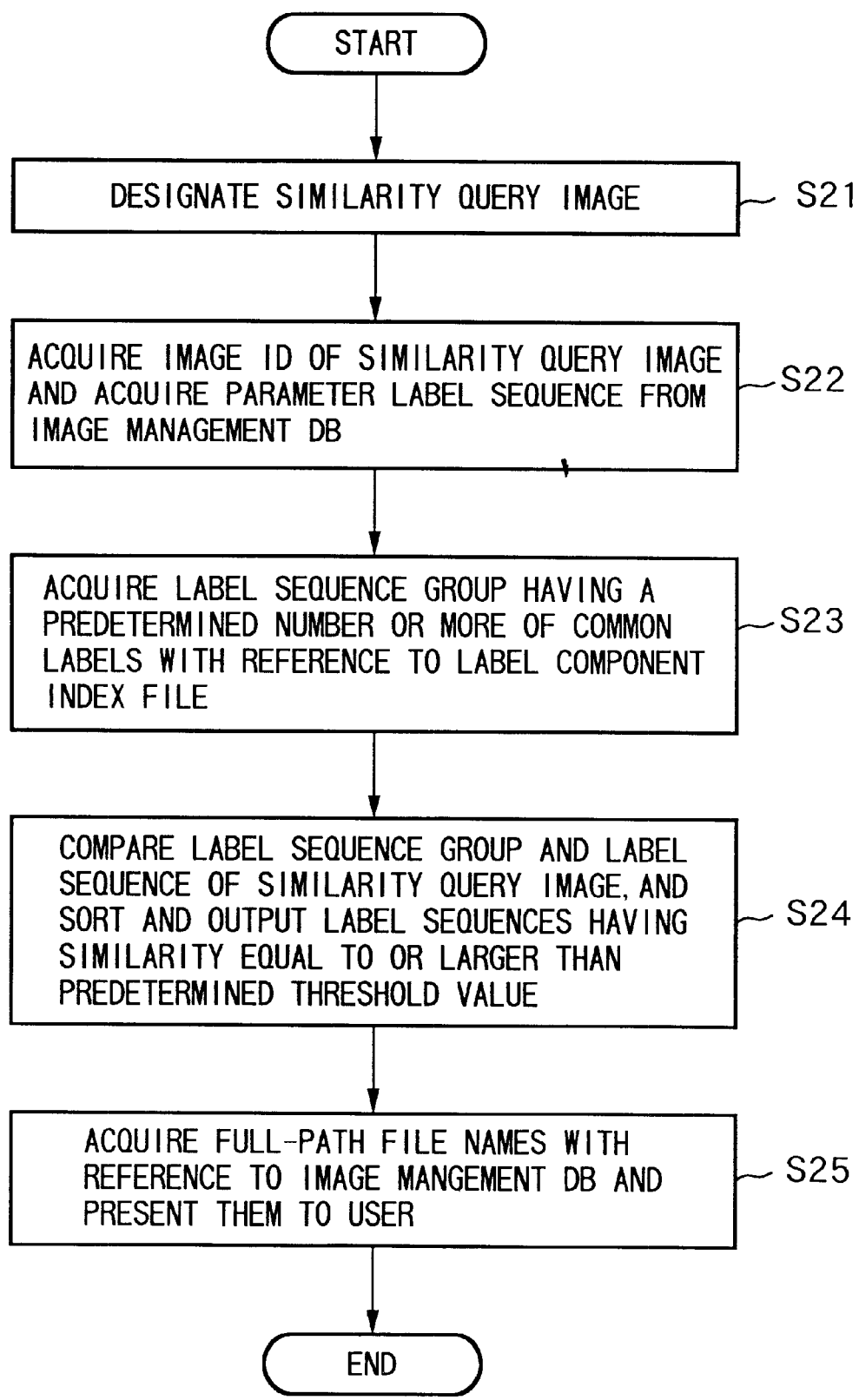
FIG. 9 is a flow chart for explaining the processing sequence of a similar image search according to the first embodiment.

The similar image search process will be explained below with reference to the flow chart in FIG. 9. FIG. 9 is a flow chart for explaining the processing sequence of a similar image search according to the first embodiment. In the first embodiment, upon initialization, a label component index file (FIG. 10) having label components as keys is generated in advance by acquiring label sequences of the already registered images from those in the image management DB 18, and is stored in the label sequence index 19. Note that "initialization" may be done at the startup timing of either the system or application. Also, when a new image is registered, and associated information is registered in the image management DB, the label component index is generated.

Figure 10:
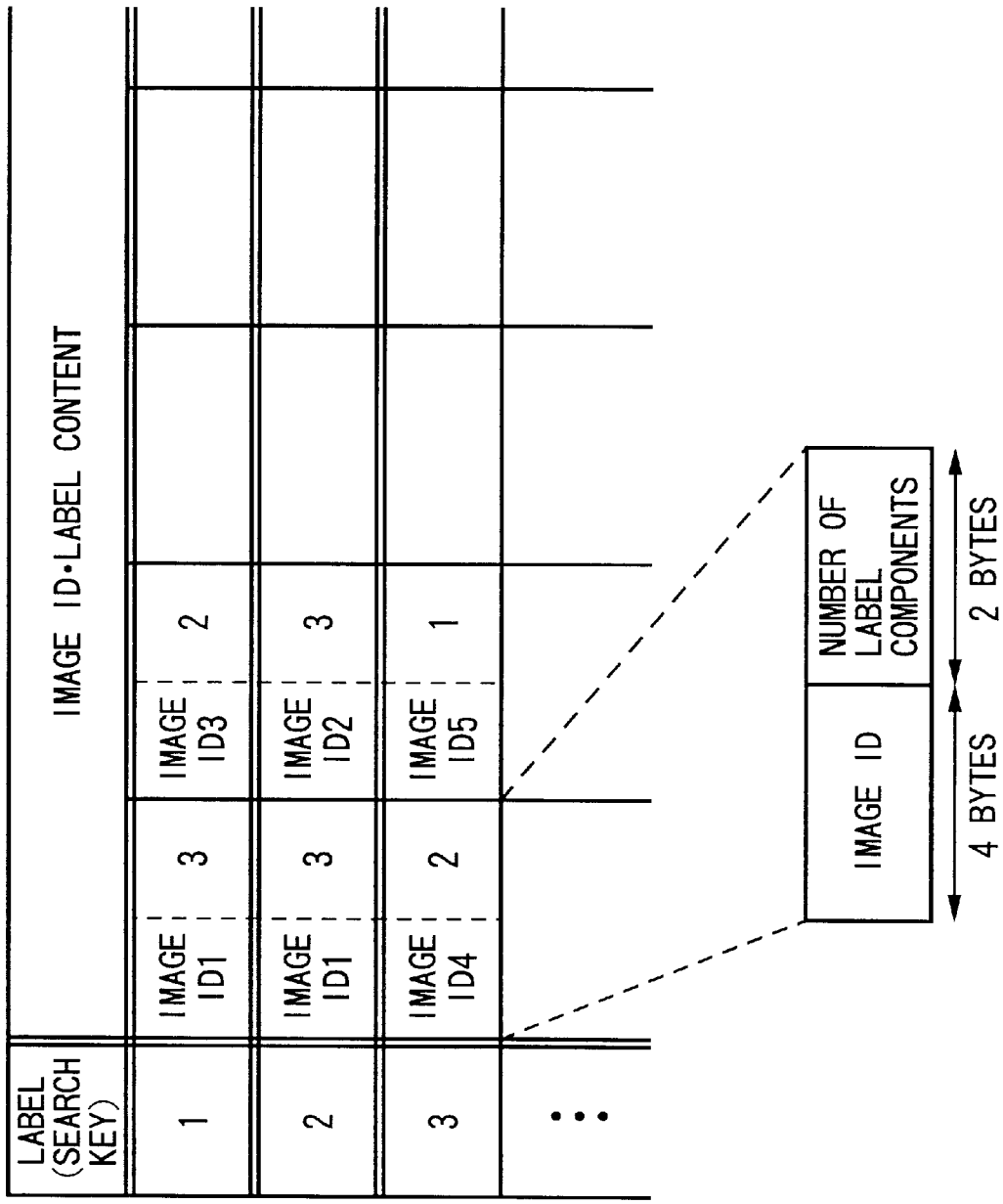
FIG. 10 is a view showing an example of the data format of a label component index.

FIG. 10 shows an example of the data format of the label component index. As shown in FIG. 10, the label component index has IDs of image data having those labels in units of label components. Note that the label component index file need not be re-generated until registration and deletion or change of an image need be reflected. Of course, upon registration of each image data, the label component index may be added. In such case, after step S15 in FIG. 4, the label component index of the newly registered image is registered.

Using each label component as a key, the label component index shown in FIG. 10 stores the image IDs which include that label component, and the numbers of labels included in those image data. Using such index, the image IDs of image data that include label components of a query image can be directly extracted. When image IDs stored in correspondence with each key are sorted in ascending or descending order of the numbers of labels, the processing speed can be further improved.

Referring back to FIG. 9, if a similarity query image is designated at the user interface unit 11 in step S21, the image ID of the designated similarity query image is acquired and the label sequence (color label sequence in this embodiment) is also acquired from the image management DB 18 in step S22.

In step S23, label sequences (those in the label sequence index) including a predetermined number or more of identical labels to those of the label sequence of the similarity query image are acquired with reference to the label component index file. This step is executed for the following reason. If similarity comparison with the label sequences of all registered images is done, a long processing time is required. Hence, after label sequences are narrowed down to those similar to that of the query image to a certain extent, i.e., to similar label sequences, they undergo one-to-one comparison with that of the similarity query image, thus improving the processing speed. Note that similar label sequences include a predetermined number or more of identical or similar labels to those of the label sequence of the similarity query image. Also, similar labels are those having a small inter-label penalty shown in FIG. 11 (to be described later). Of course, if a long processing time is tolerable, the label sequence of the query image is compared to those of all the registered images to attain a search with high precision (in this case, step S23 is omitted).

As a method of narrowing down candidate images to fewer images using the aforementioned label component index file, various methods may be used. For example, in this embodiment, a label sequence consisting of nine labels is used. A label sequence including three central labels (fourth to sixth labels) of that label sequence is extracted as a similar label sequence to narrow down images to fewer images. This is because characteristic information of an image is normally located at the center of that image.

In step S24, the label sequences acquired in step S23 are compared with that of the similarity query image to compute their similarity. Then, the label sequences are output as search results in the order from that which is most similar to the label sequence of the similarity query image together with their similarity.

A method of performing similarity comparison (computing similarity) between label sequences will be explained below.

FIG. 11 shows an example of a penalty matrix between labels used upon comparing the label sequences to obtain similarity. As the value in the matrix is smaller, the similarity becomes higher. For example, the penalty value between labels 2 and 6 is "7". The penalty value between identical labels is "0". The objective of using this matrix is to perform distance discrimination in correspondence with label similarities. More specifically, in this embodiment, since the RGB color space is used as a feature amount space, distance discrimination corresponding to color similarities can be done.

Figure 13:
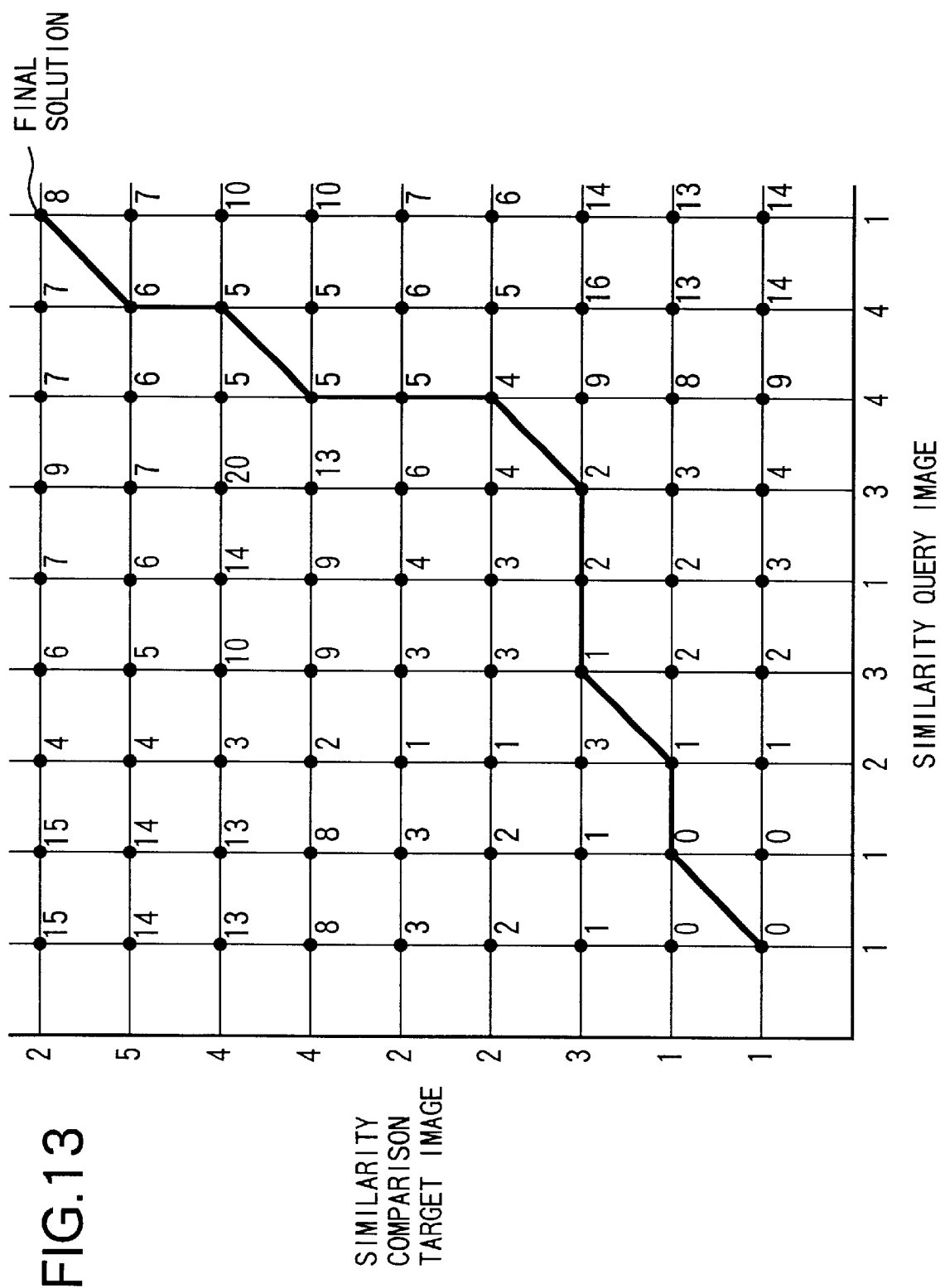
FIG. 13 is a view for explaining the distance computation between the label sequences using DP matching.

For instance, distances are obtained from label values at the corresponding positions in the label sequences of a query image and a target or candidate with reference to the penalty matrix shown in FIG. 11, and the sum of the distances of all the labels in the label sequence is computed to obtain the distance between the two label sequences. For example, in the example shown in FIG. 12, since the query image has a label sequence "112313441" and a target image has a label sequence "113224452", a distance (final solution) is obtained, as shown in FIG. 13, by DP matching using the penalty matrix shown in FIG. 11. In this example, the following condition is used as a gradient constraint.

Figure 14:
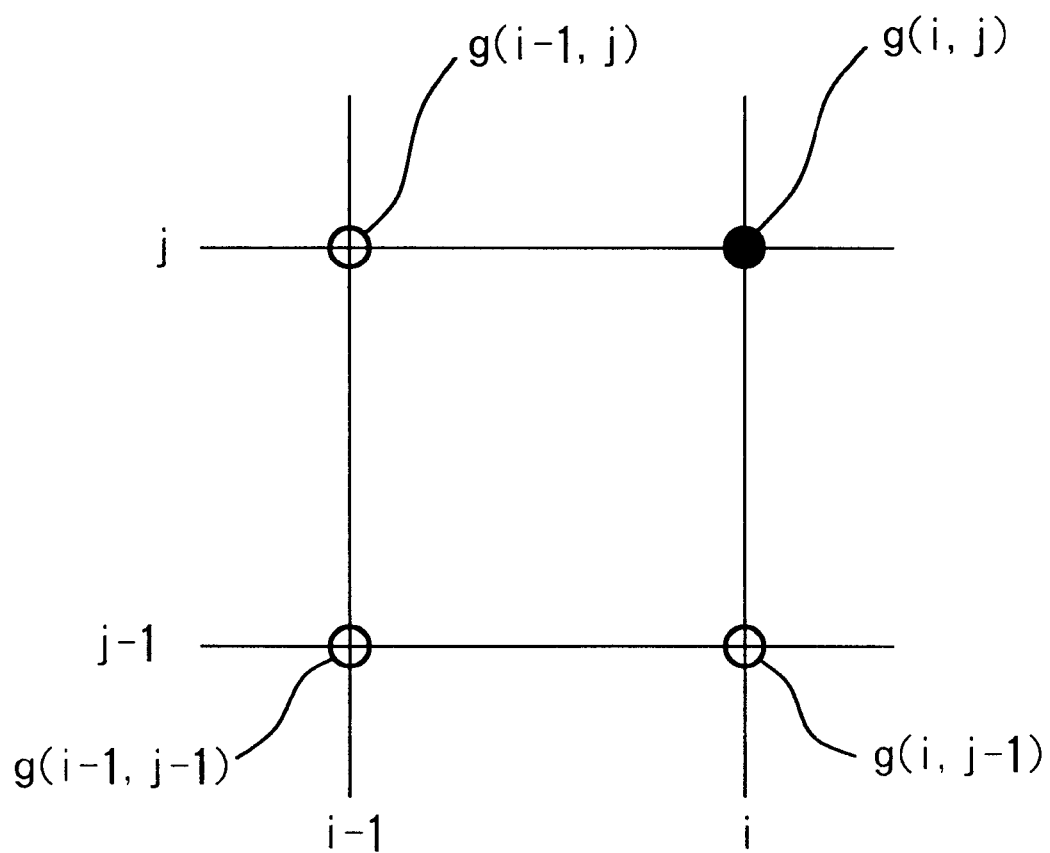
FIG. 14 is a view for explaining the distance computation between the label sequences using DP matching.

More specifically, as shown in FIG. 14, let g(i–1, j), g(i–1, j–1), and g(i, j–1) be costs at grid points (i–1, j), (i–1, j–1), and (i, j–1), and d(i, j) be the penalty on a grid point (i, j). Then, cost g(i, j) on the grid point (i, j) is obtained by a recurrence formula:

$$g(i, j) = \min \begin{cases} g(i, j-1) + d(i, j) \\ g(i-1, j-1) + 2 \cdot d(i, j) \\ g((i-1, j) + d(i, j) \end{cases}$$

As described above, in order to assign a small penalty (distance) to neighboring cells and to assign a large penalty to distant cells upon pattern matching between labels, the penalty matrix between labels shown in FIG. 11 is used. In step S24, the label sequences are compared in consideration of this penalty matrix. In the above example, in comparison between the label sequences, DP matching used in speech recognition or the like is used to implement comparison between the labels-that can ambiguously move the label positions to be compared back and forth, and can minimize the total distance (maximize similarity). Upon comparing the label sequences, in place of the aforementioned DP matching, matching such as automaton that can ambiguously compare label sequences may be used. Using such ambiguity method, a small penalty can be assigned to addition of an extra label, missing label, and repetition of identical labels, and a distance computation between label sequences is made for penalty between labels using the penalty matrix between color labels shown in FIG. 11, thus allowing ambiguous pattern matching. Note that the automaton can use a "fuzzy nondeterministic finite automaton" described in an "ambiguous character string search method and system using fuzzy nondeterministic finite automaton in Japanese Laid-Open Patent No. 8-241335". In this automaton, the distance (penalty) between symbols can be designated using multivalued data.

Furthermore, when the block order rules shown in FIGS. 7A to 7C are used in addition to the above-mentioned ambiguous pattern matching, comparison between color label sequences which can reduce the influences of a delicate angle difference or displacement between images to be compared, and can reduce influences of displacements in any of the upper, lower, right, and left directions, can be attained. More specifically, DP matching and fuzzy nondeterministic automaton permit ambiguity as to position in a label sequence, and have a nature of absorbing the influences of positional displacement of an image. When the object position has changed due to a change in angle or the like, and the positions of the object segmented into blocks have also changed, the color tones of the blocks may delicately vary. Such variation is absorbed by the above-mentioned penalty matrix. In this fashion, matching that suffers less influences of displacements in any of upper, lower, right, and left directions can be attained by a synergistic effect of matching that permits ambiguity by DP matching or fuzzy automaton, and permission of ambiguity as to feature amount by the penalty matrix. Furthermore, since the oblique scan shown in FIGS. 7A to 7C can eliminate a change in label position due to a change in object position, the influences of displacement of the object upon matching can be effectively reduced.

In step S25, the full-path file names of the image IDs are acquired with reference to the image management DB 18, and are presented to the user.

With the above-mentioned processing, a high-speed robust similar image search that can absorb some color differences or the like produced due to a change in image angle, object position, or image sensing condition, can be done.

In case of a similarity search that considers one parameter with respect to a single image which cannot be segmented into blocks, a search based on a statistical distance measure may be done using similarity (generated using the sum total of penalties) obtained by the present invention as one new feature amount. In the above embodiment, similar images having similarities exceeding a predetermined value are obtained as search results. A given number of images, which is designated in advance, may be output as search results in descending order of similarity.

To restate, according to the first embodiment, a feature amount group (a group of feature amounts obtained by segmenting the feature amount space) is expressed by a single symbol (i.e., labeled), and a distance based on similarity between labels is given using the penalty matrix. For this reason, the computation volume of distances between blocks of two images can be greatly reduced. Also, since similar feature amounts are expressed by a single label, a similar image search can be satisfactorily done.

Using (1) the concept of distance between labels on the basis of the penalty matrix, and (2) a method of implementing comparison between label sequences, such as DP matching, fuzzy nondeterministic automaton, or the like, which can ambiguously move the label positions to be compared back and forth, and can minimize the total distance (maximize similarity), even when the image angle has changed more or less, a search can be done, and similar images can be obtained as matches by a search.

Furthermore, according to the above embodiment, since the index database (label component index (FIG. 10)) is used, an image search can be done at higher speed.

Second Embodiment

In the first embodiment, a similar image search is done by arranging labels that represent feature amounts one-dimensionally, i.e., using a label sequence. In the second embodiment, a similar image search is done considering two-dimensional arrays of labels that represent feature amounts, i.e., using a label matrix. Note that the control arrangement of an image search apparatus according to the second embodiment is the same as that of the first embodiment (FIG. 1), and a detailed description thereof will be omitted.

Figure 15:
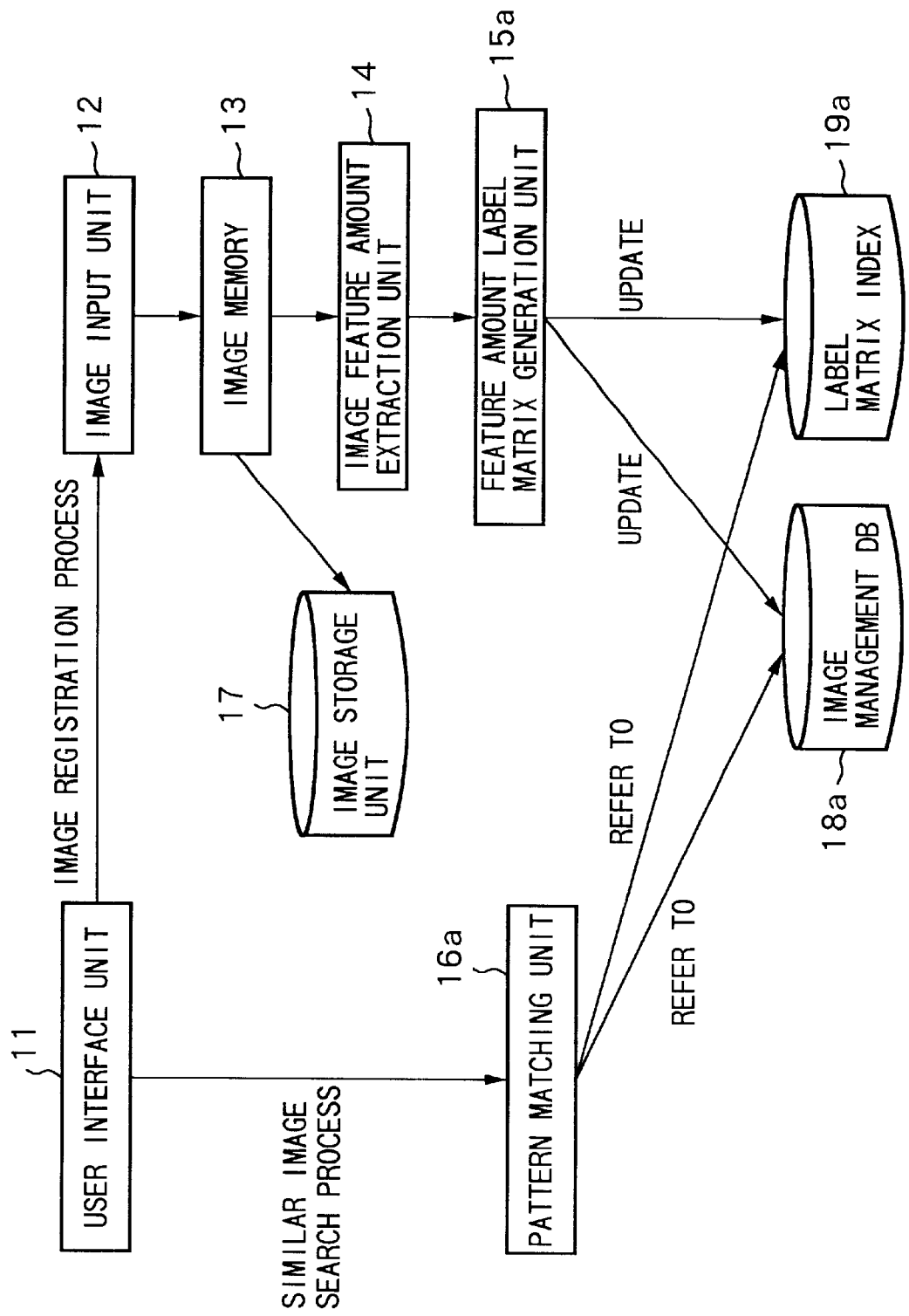
FIG. 15 is a block diagram showing the functional arrangement of an image search apparatus according to the second embodiment of the present invention.

FIG. 15 is a block diagram showing the functional arrangement of the image search apparatus of the second embodiment. In FIG. 15, a user interface unit 11, image input unit 12, image memory 13, image feature amount extraction unit 14, and image storage unit 17 have the same arrangements as those in the first embodiment (FIG. 2).

Reference numeral 15a denotes a feature amount label matrix generation unit, which generates a label matrix on the basis of feature amounts obtained by the image feature amount extraction unit 14. Reference numeral 16a denotes a pattern matching unit, which computes the similarities between the label matrix of the designated image, and those of images stored in the image storage unit 17 using two-dimensional DP matching (to be described later). Reference numeral 18a denotes an image management database (to be referred to as an image management DB hereinafter) which manages image data stored in the image storage unit 17 in the data format shown in FIG. 16. Reference numeral 19a denotes a label matrix index that stores a label component index file shown in FIG. 10.

An example of the operation of the image search apparatus of the second embodiment with the above arrangement will be explained below. In the example to be described below, three colors, i.e., red (R), green (G), and blue (B) are used as image feature amounts that pay attention to colors, and processes in a three-dimensional color space will be explained.

Image Registration Process

Figure 17:
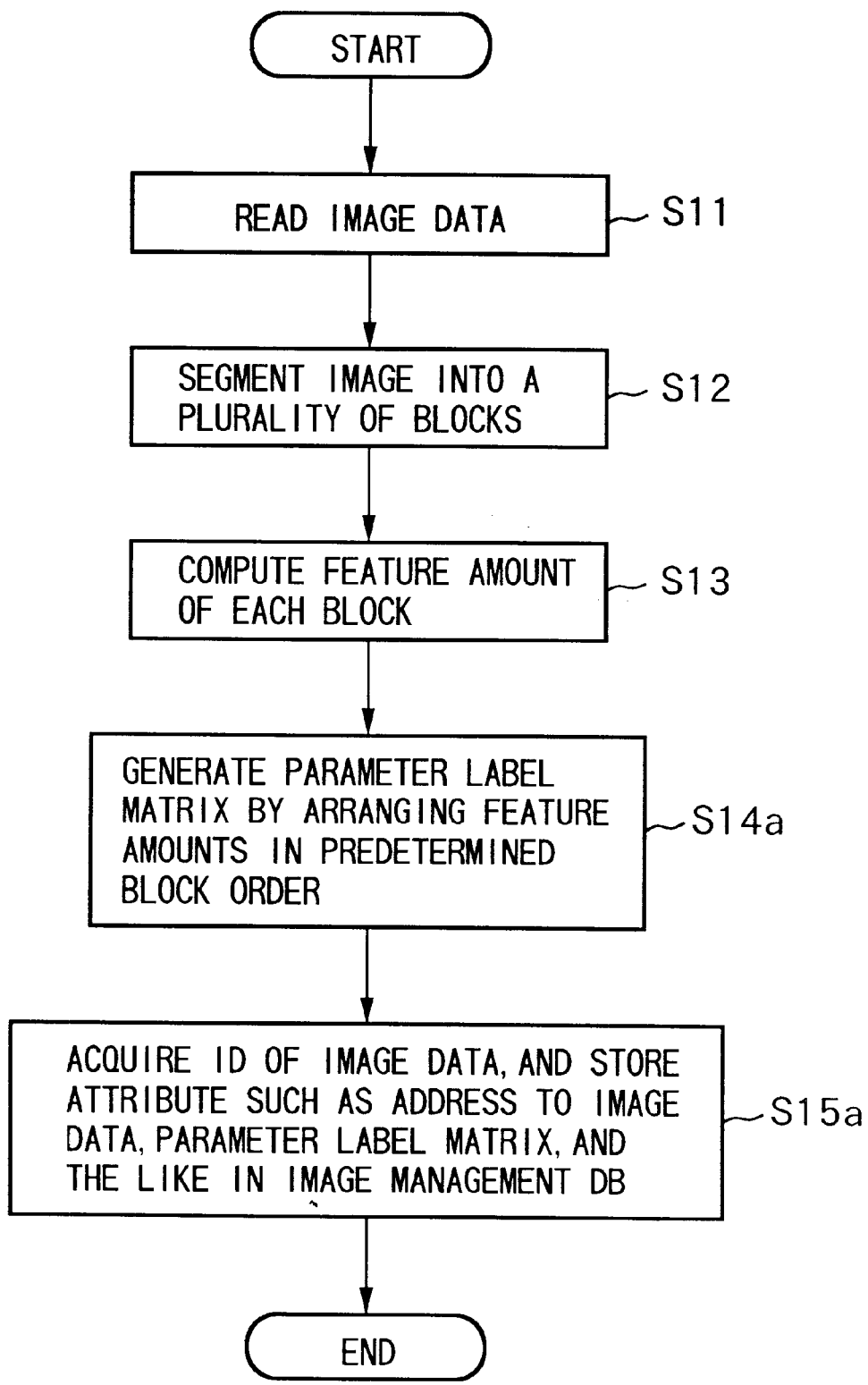
FIG. 17 is a flow chart showing the sequence of an image registration process according to the second embodiment.

FIG. 17 is a flow chart showing the image registration process sequence according to the second embodiment. In FIG. 17, steps S11 to S13 are the same as those described in the first embodiment (FIG. 4).

After parameter labels are assigned to the respective blocks by the processes in steps S11 to S13, the parameter labels assigned to the blocks are arranged in a predetermined block order to generate a parameter label matrix (to be referred to as a label matrix hereinafter) in step S14a. FIGS. 18A to 18E are views for explaining examples of the block orders upon generating a label matrix. The parameter labels are arranged in accordance with numerals in the segmented image blocks shown in each of FIGS. 18A to 18E to generate a label matrix. Upon storing the label matrix in the image management DB 18a or label matrix index 19a, the two-dimensional label matrix is converted into a one-dimensional sequence in a predetermined order. In this embodiment, such one-dimensional sequence is also referred to as a label matrix.

In the order shown in FIG. 18A, the segmented blocks are scanned horizontally from the left to right, and this horizontal scan repeats itself from the upper to lower position. Note that scan methods which can be applied to this embodiment are:

horizontal direction (there are four different scan methods including a scan from the left to right that repeats itself from the lower to upper position, and the like, as shown in FIGS. 18B to 18D, in addition to a scan from the left to right that repeats itself from the upper to lower position, as shown in FIG. 18A);

vertical direction (there are four different scan methods including a scan from the upper to lower position that repeats itself from the left to right, and the like); and using different scan methods for even and odd lines, as shown in FIG. 18E.

Note that the second embodiment use the scan method shown in FIG. 18A, but other scan methods described above can be used.

In step 115a, the label matrix and image data obtained in this way are stored in the image storage unit 17 and image management DB 18a. More specifically, an image ID is acquired for the image data captured in step S11, and a pair of the image ID and image data are stored in the image storage unit 17. An image management DB record shown in FIG. 16 is generated in correspondence with that image ID, and is registered in the image management DB 18a.

The image management DB record shown in FIG. 16 is substantially the same as that shown in FIG. 8, except that the "label matrix" is stored in place of the "label sequence".

The process to be done upon image registration has been described.

Similar Image Search Process

The similar image search process will be explained below with reference to the flow chart shown in FIG. 19. FIG. 19 is a flow chart for explaining the processing sequence of a similar image search according to the second embodiment. In this embodiment, upon initialization, a label component index file having label components as keys is generated in advance by acquiring label matrices of the already registered images from those in the image management DB, and is stored in the label matrix index 19a. Note that "initialization" may be done at the startup timing of either the system or application. Also, when a new image is registered, and associated information is registered in the image management DB, the label component index is generated.

In the second embodiment as well, the label component index (FIG. 10) that has been described in the first embodiment is used. More specifically, addresses (column IDs) to label matrices that include those labels are registered in the label component index in units of label components. Note that the label component index file need not be re-generated until registration and deletion or change of an image need be reflected. Of course, as has been described in the first embodiment, upon registration of each image data, the label component index may be added.

If a similarity query image is designated at the user interface unit 11 in step S21, the image ID of the designated similarity query image is acquired and the label matrix (color label matrix in this embodiment) is also acquired from the image management DB 18a in step S22a.

In step S23a, label matrices (those in the label component index) including a predetermined number or more of identical labels to those of the label matrix of the similarity query image are acquired with reference to the label component index file. This step is executed for the following reason. If similarity comparison with the label matrices of all registered image is done, a long processing time is required. Hence, after label matrices are narrowed down to those similar to that of the query image to a certain extent, i.e., to similar label matrices, they undergo one-to-one comparison with that of the similarity query image, thus improving the processing speed. Note that similar label matrices include a predetermined number or more of identical or similar labels to those of the label matrix of the similarity query image. Also, similar labels are those having a small inter-label penalty, as described in FIG. 11. Of course, if a long processing time is not an issue, the label matrix of the query image is compared to those of all the registered images to attain a search with high precision (in this case, step S23a is omitted).

Note that various methods are available for extracting similar label matrices using the label component index. For example, as has been described in the first embodiment, a label matrix including a predetermined number or more of labels identical or similar to predetermined labels (e.g., three central labels) may be extracted as a similar label matrix with reference to the label component index.

In step S24a, the label matrices acquired in step S23a are compared with that of the similarity query image to compute their similarities. Then, the label matrices are output as search results in the order from that which is most similar to the label matrix of the similarity query image together with their similarities.

A method of performing similarity comparison (computing similarity) between label matrices will be explained below. In the following description, the label matrices acquired in step S23a will be referred to as similarity comparison target images.

As in the first embodiment, the second embodiment uses the penalty matrix (FIG. 11) between labels upon computing similarity by comparing label matrices.

More specifically, in order to assign a small penalty (distance) to neighboring cells and to assign a large penalty to distant cells upon pattern matching between labels, the penalty matrix between labels shown in FIG. 11 is used. In step S24a, the label matrices are compared in consideration of this penalty matrix. Upon comparison, the second embodiment uses two-dimensional DP matching to be described below.

FIGS. 20A to 20C are views for explaining the similarity computation process according to the second embodiment. The label matrix of the similarity query image acquired in step S22a above can be arranged, as shown in FIG. 20B, according to its scan method. On the other hand, if one of label matrices extracted in step S23a is used as a similarity comparison target image, its label matrix can be arranged, as shown in FIG. 20A.

Distances between a label sequence "abc" in the first row of the similarity comparison target image, and label sequences ("123", "456", and "789") in the first to third rows of the similarity query image are obtained by DP matching, and the row number in the similarity query image of the label sequence with a minimum distance is stored at a corresponding position in a similar line matrix (FIG. 20C). When the obtained minimum distance is larger than a predetermined threshold value, it is determined that the label sequence of interest of the similarity search target image is not similar to any rows, and "!" is stored at the corresponding position of the similar line matrix. Owing to the nature of DP matching, even when the image angle has changed horizontally more or less, a similar row (line) can be detected by the above-mentioned process. Such process repeats itself for all the rows {"def", "ghi") of the similarity comparison target image, thus obtaining a similar line matrix in the column direction shown in FIG. 20C.

FIG. 20C indicates that no line similar to "abc" is found in the similarity query image, a line similar to "def" is found in the first row in the similarity query image, and a line similar to "ghi" is found in the second row in the similarity query image. Similarity between the obtained similar line matrix and a standard line matrix (a row of the similarity query image: "123" in this embodiment) is computed using DP matching, and is output as that between the similarity query image and the similarity comparison target image of interest. As is well known, DP matching executes a process that compares by giving optimum elasticity parameters to the label sequence to be compared (tolerating without selecting the next partner to be compared) so that the label sequence to be compared has a smallest similarity distance. Also, a constraint condition (the width of a matching window) can be given as an elasticity (tolerance) bound.

Figure 21:
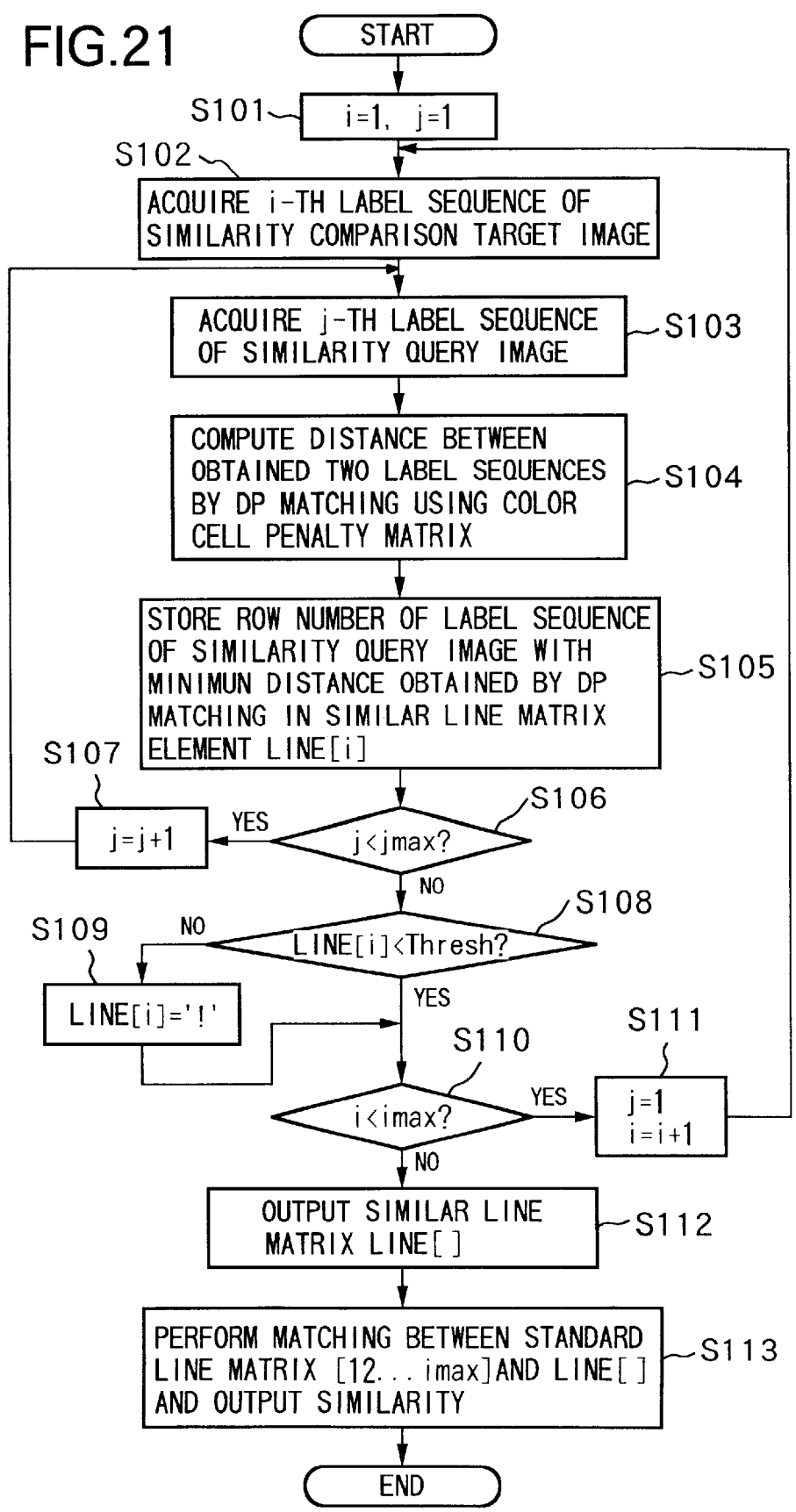
FIG. 21 is a flow chart for explaining the sequence of a similarity computation using two-dimensional DP matching according to the second embodiment.

FIG. 21 is a flow chart for explaining the sequence of a similarity computation using two-dimensional DP matching according to the second embodiment. The process that has been explained with reference to FIGS. 20A to 20C will be explained in more detail with reference to the flow chart shown in FIG. 21.

In step S101, variable i that indicates the row number of the similarity comparison target image and variable j that indicates the row number of the similarity query image are reset to "1" to indicate the first row. In step S102, a label sequence of the i-th line of the similarity comparison target image is acquired. For example, in case of FIGS. 20A to 20C, if i=1, "abc" is acquired. In step S103, a label sequence of the j-th row of the similarity query image is acquired. For example, in case of FIGS. 20A to 20C, if j=1, "123" is acquired.

In step S104, the distance between the two label sequences acquired in steps S102 and S103 is computed by DP matching using the color cell penalty matrix described above with reference to FIG. 11. In step S105, if the distance obtained in step S104 is a minimum one of those obtained so far in correspondence with the i-th row, the row number (j) is stored in a line matrix element LINE[i].

The processes in steps S103 to S105 repeat themselves for all rows of the similarity query image (steps S106 and S107). In this way, the number of that row of those included in the similarity query image, which has a minimum distance from the label sequence of the similarity comparison target image is stored in LINE[i].

In step S108, LINE[i] obtained by the above process is compared with a predetermined threshold value (Thresh). If LINE[i]≧Thresh, the flow advances to step S109, and "!" indicating that the label sequence of interest is not similar to any rows is stored in LINE[i].

By repeating the processes in steps S102 to S109 described above for all the rows of the similarity comparison target image (steps S110 and S11), LINE[i] to LINE[imax] are obtained, and are output as a similar line matrix LINE[ ] in step S112.

In step S113, DP matching is done between a standard line matrix [12 . . . imax] and the similar line matrix LINE[ ], thus computing their distance. Note that the standard line matrix is the one which starts from "1" and increases in unitary increments in the column direction.

Penalty used in DP matching between the standard line matrix and similar line matrix will be explained below. As penalty to be set used in DP matching between the similar line matrix and standard line matrix in the column direction, two, dynamic penalty and fixed penalty are available.

Dynamic penalty sets penalty between line numbers, which changes from one image to another. In this embodiment, distances of the label matrix in the horizontal (row) direction of the similarity query image itself are obtained, and penalty between rows is obtained based on the distances.

Figure 22:
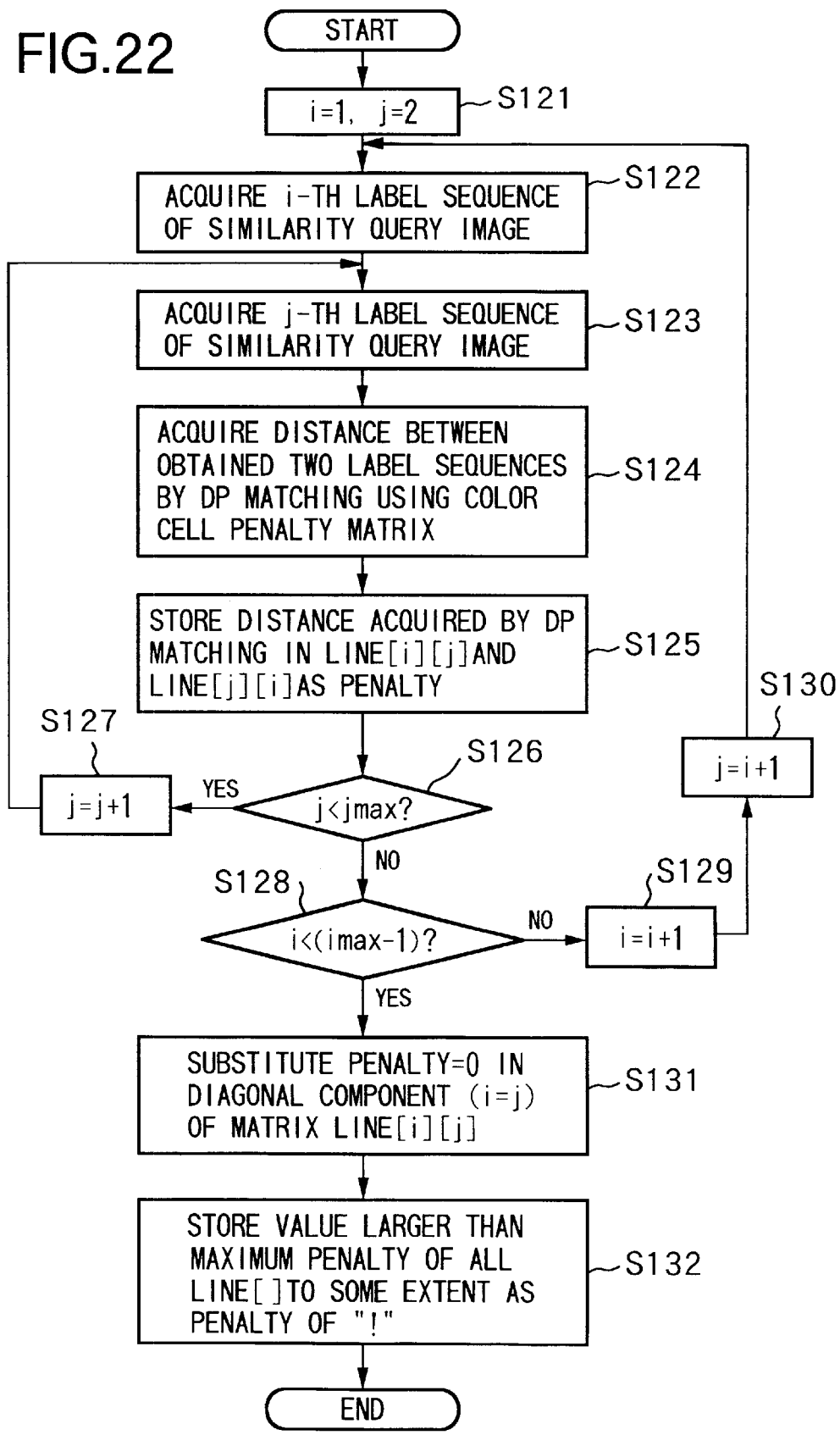
FIG. 22 is a flow chart showing the dynamic setting sequence of a penalty value according to the second embodiment.

FIG. 22 is a flow chart showing the setting sequence of the dynamic penalty value according to the second embodiment. In step S121, variables i and j are respectively set at 1 and 2. Label sequences of the i-th and j-th rows of the similarity query image are acquired respectively in steps S122 and S123. In step S124, DP matching is done between the label sequences of the i-th and j-th rows of the similarity query image using the color penalty matrix, thus acquiring distance. In step S125, the DP matching distance obtained in step S124 is stored in LINE[i][j] as penalty between the label sequences of the i-th and j-th rows of the similarity query image, and is also stored in LINE[j][i] as penalty between the j-th and i-th label sequences of the similarity query image.

The processes in steps S123 to S125 repeat themselves until the value of variable j reaches jmax in step S126. As a result, the penalty values between the label sequence of the i-th row and those of the (i+1)-th to jmax-th rows are determined. In steps S128, S129, and S130, the processes in steps S123 to S126 repeat themselves until the value of variable i reaches imax−1. As a result, LINE[i][j] stores penalty values determined by the above processes in all components except for a diagonal component i=j.

In step S131, the penalty of the diagonal component of LINE[i][j], which is not determined by the above process, is determined. Since this portion has i=j, i.e., an identical label sequence, the distance is zero, and hence, penalty=0 is stored. In step S132, penalty for "!" is determined. More specifically, as penalty for "!", a value which is larger than the maximum one of all the penalty values in LINE[i][j] to some extent is set. However, if an extremely large value is set as this penalty, the ambiguous hit ratio suffers.

DP matching in step S113 is done using the penalties between label sequences computed for the similarity query image to acquire similarity between the similarity query image and similarity comparison target image.

On the other hand, with fixed penalty, if labels match, penalty "0" is given as that for DP matching; if they do not match, or if a label is compared with "!", a relatively large penalty is given. In this case, the penalty remains the same independently of the similarity query image. Using such fixed penalty, the process in step S113 is executed to determine similarity between the similarity query image and similarity comparison target image.

The aforementioned matching process has the following features. If matrices shown in FIGS. 20A and 20B are very similar to each other, a similar line matrix "123" is obtained, and its distance is zero. If a similar line matrix is "!12" or "212", the similarity comparison target image may have been displaced downward from the similarity query image; if a similar line matrix is "23!" or "233", the similarity comparison target image may have been displaced upward from the similarity query image. If a similar line matrix is "!3!"or "!!3", the similarity comparison target image may have been reduced in scale from the similarity query image. Also, a case wherein the similarity comparison target image is an enlarged one of the similarity query image can be detected.

As has been described in step S113 above, by executing DP matching between the similar line matrix and standard line matrix, vertical displacement is effectively absorbed. For this reason, the difference between the similarity query image and similarity comparison target image due to upward or downward displacement, enlargement, reduction, or the like can be effective absorbed, thus attaining a satisfactory similarity search.

More specifically, the two-dimensional DP matching of this embodiment permits ambiguity as to position in each label sequence of a label matrix, and has a nature of absorbing the influences of positional displacement of an image. When the object position has changed due to a change in angle or the like, and the positions of the object segmented into blocks have also changed, the color tones of the blocks may delicately vary. Such variation is absorbed by the above-mentioned penalty matrix. In this fashion, matching that suffers less influences of upward, downward, right, and left enlarged and reduced displacements can be attained by a synergistic effect of matching that permits ambiguity by DP matching or fuzzy automaton, and permission of ambiguity as to feature amount by the penalty matrix.

Of dynamic and fixed penalties, dynamic penalty is preferably used. For example, if a similarity query image is a reach of wheat field, similar label sequences may be obtained for all lines. On the other hand, if similarity comparison target images include that of a reach of wheat field, a number "1" of the first line may be set in the similar line matrix of this image to yield "111". In this case, all lines of the similarity query image are similar images but their line numbers are "1 2 3". Hence, no hit occurs at small distance unless a very small penalty is set between line numbers. If dynamic penalty is used, a small penalty is set between line numbers, and a result with high similarity can be obtained.

On the other hand, if fixed penalty is used, a large penalty value is determined between "123" and "111", resulting in low similarity.

In step S24a in FIG. 19, the aforementioned similarity computation process is executed for all label matrices acquired in step S23a, and the obtained similarities are sorted in descending order. Then, the flow advances to step S25a. In step S25a, the full-path file names of the respective image IDs are acquired with reference to the image management DB 18a, and are presented to the user.

As described above, since DP matching is done in the horizontal and vertical directions, i.e., two-dimensionally, even when the image angle has changed or the object has moved in the horizontal and vertical directions, and in oblique directions, a search can be done. Also, owing to the time-warping characteristics of DP matching, a zoom- or macro-sensed image can also be obtained by a search.

In the above embodiment, a similar line matrix is obtained using label sequences corresponding to a horizontal array of blocks. Also, a similar line matrix can be obtained using label sequences corresponding to a vertical array of blocks by the same technique as that described above.

To reiterate, according to the second embodiment, a feature amount group (a group of feature amounts obtained by segmenting the feature amount space) is expressed by a single symbol (i.e., labeled), and distance based on similarity between labels is given using the aforementioned two-dimensional DP matching and penalty matrix. For this reason, the computation volume of distances between blocks of two images can be greatly reduced. Also, since similar feature amounts are expressed by a single label, a similar image search can yield good results.

Using (1) the concept of distance between labels on the basis of the penalty matrix, and (2) the above-mentioned two-dimensional DP matching that implements comparison between label matrices, so as to be able to ambiguously move the label positions to be compared back or forth, and to minimize the total distance (maximize similarity), even when the image angle has changed more or less, a search can be done, and similar images can be obtained as matches by a search.

Furthermore, according to the above embodiment, since the index database (label component index) is used, an image search can be done at higher speed.

More specifically, according to this embodiment, a high-speed similar image search can be done in consideration of the layout of image feature amounts, and a similar image search that can absorb differences produced due to variations of image sensing conditions and the like can be done. Hence, a robust similar image search that can absorb some different image feature amounts due to a change in image angle or object position, or variations of other image sensing conditions can be realized, although such search cannot be attained by a conventional system.

In each of the above embodiments, a natural image search has been exemplified. However, it is known to those who are skilled in the art that the present invention is applicable to an artificial image search such as CG images, CAD images, and the like.

In each of the above embodiments, color information is selected as an image feature amount. However, the present invention is not limited to such specific image feature amount, and can be practiced by obtaining other image parameters in units of blocks obtained by segmenting an image.

In each of the above embodiments, recognition based on a single feature amount has been exemplified. Also, by computing ANDs or ORs with search results using other feature amounts, a high-speed search can be attained based on a plurality of feature amounts.

When a search is done for a single image using a plurality of image feature amounts, similarity obtained by the present invention is used as one new image feature amount to execute multivariate analysis using a plurality of parameters, and a search using a statistical distance measure can be attained. Also, in the above embodiment, a similar image having similarity that exceeds a predetermined value is obtained as a search result. A number of images designated in advance may be output as search results in descending order of similarity.

Figure 23:
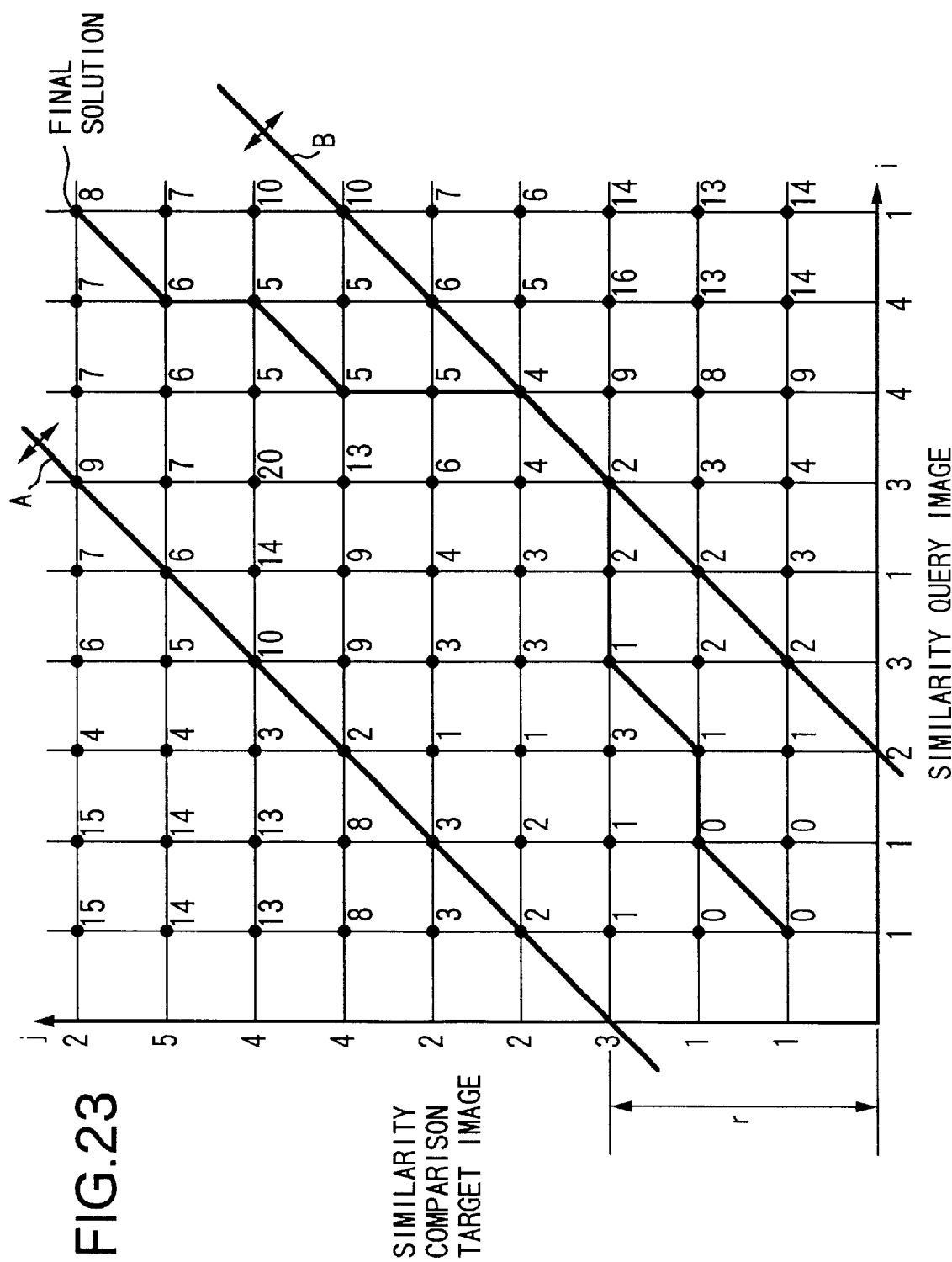
FIG. 23 is a view for explaining adjustment of a matching window in DP matching.

By changing the width of a so-called matching window in DP matching by designating an ambiguity level, the ambiguity level of a search can be desirably set. FIG. 23 is a view for explaining the matching window in DP matching. Referring to FIG. 23, line A is given by J=I+r, and line B is given by J=I−r. The width of the matching window can be changed by changing the value r. If the value r can be changed, a similarity search can be done at an ambiguity level (width of the matching window) desired by the user.

In the two-dimensional DP matching like in the above embodiment, the width of a matching window in horizontal DP matching and that of a matching window in vertical DP matching may be separately set. Alternatively, the two matching windows may change at different rates. In this way, the user can finely set ambiguity in a similarity image search. For example, when the block order shown in one of FIGS. 18A to 18E is used, and horizontal movement of the object of interest in the query image is to be permitted, or the query image is a horizontally elongated image, the width of the matching window in horizontal DP matching can be increased to increase the ambiguity level in the horizontal direction.

As mentioned above, according to the present invention, a similar image search can be done in consideration of the layout of image feature amounts.

According to the present invention, a similar image search can be done in consideration of the layout of image feature amounts, and a similar image search that can absorb differences produced due to variations of image sensing conditions and the like can be done. Hence, a robust similar image search that can absorb some different image feature amounts due to a change in image angle or object position, or variations of other image sensing conditions can be realized, although such search cannot be attained by a conventional system.

Furthermore, according to the present invention, since an index table that registers image data on the basis of feature amount labels is used, candidate image data to be subjected to similarity computation can be efficiently narrowed down to fewer images, thus greatly improving the similarity search processing speed.

Third Embodiment

In the first and second embodiments described above, similarity is computed between label sequences or matrices consisting of labels that express image feature amounts, using a matching process such as DP matching that permits a certain amount of ambiguity. In the third embodiment, similarity is computed by making an inner product computation of a histogram of feature amount labels.

Prior to making the inner product computation of the histogram of feature amount labels, a presearch using the label component index which is also used in the first and second embodiments is done to effectively narrow down candidate images to fewer images, thereby reducing the inner product computation volume and achieving a high-speed search process.

Note that the control arrangement of an image search apparatus according to the third embodiment is the same as that of the first embodiment (FIG. 1), and a detailed description thereof will be omitted.

Figure 24:
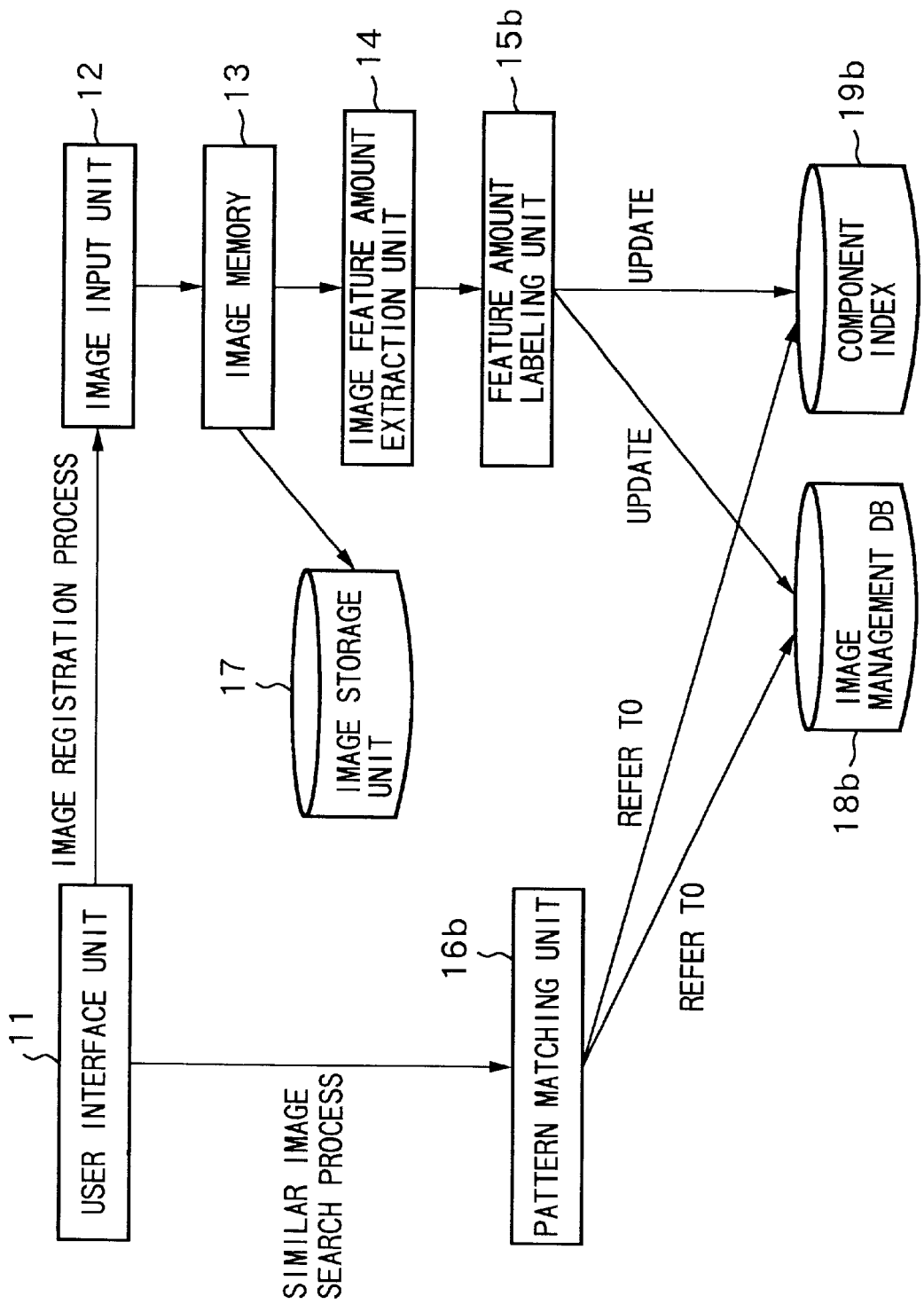
FIG. 24 is a block diagram showing the functional arrangement of an image search apparatus according to the third embodiment of the present invention.

FIG. 24 is a block diagram showing the functional arrangement of the image search apparatus of the third embodiment. In FIG. 24, a user interface unit 11, image input unit 12, image memory 13, image feature amount extraction unit 14, and image storage unit 17 have the same arrangements as those in the first embodiment (FIG. 2).

Reference numeral 15b denotes a feature amount labeling unit for labeling feature amounts obtained by the image feature amount extraction unit 14 to generate their histogram information. Reference numeral 16b denotes a pattern matching unit which searches for similar images by computing similarities between the designated image and those stored in the image storage unit 17 on the basis of their histogram information. In this embodiment, a similar image search is done by computing the inner product of histograms of feature amount labels. Note that the histogram of feature amount labels indicates the numbers of feature amount labels contained in an image of interest in units of feature amount labels. The pattern matching unit 16b performs a primary search (presearch; to be described later) prior to the similarity computation to improve the image search speed.

Reference numeral 18b denotes an image management database (to be referred to as an image management DB hereinafter), which manages image data stored in the image storage unit 17 in the data format shown in FIG. 25. Also, reference numeral 19b denotes a component index which stores a component index file shown in FIG. 10 above. Note that use of the component index will be described later with reference to the accompanying flow chart.

An example of the operation of the image search apparatus of this embodiment with the above arrangement will be explained below. In the example to be described below, three colors, i.e., red (R), green (G), and blue (B) are used as image feature amounts concerning colors, and processes in a three-dimensional color space will be explained.

Image Registration Process

Figure 26:
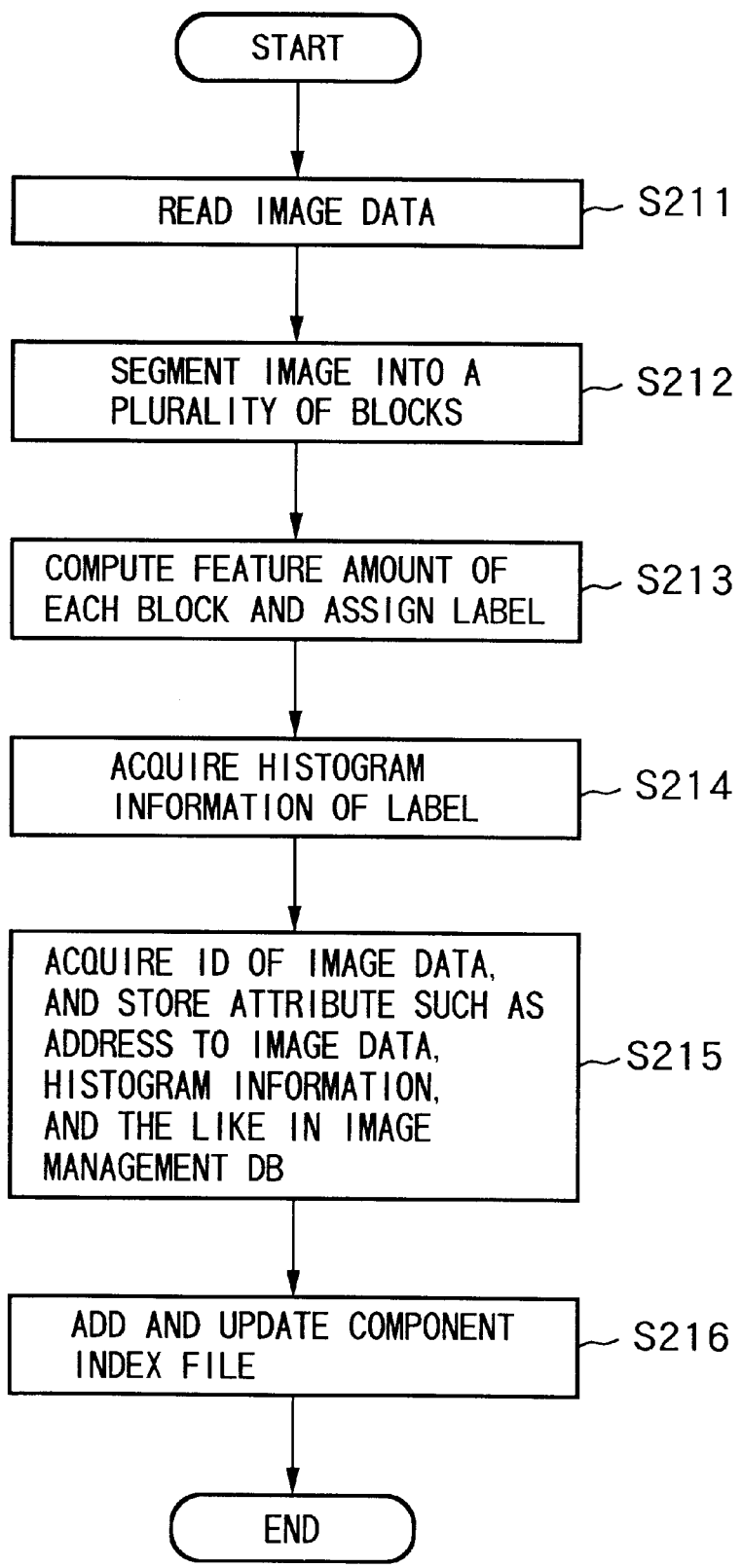
FIG. 26 is a flow chart showing the sequence of an image registration process according to the third embodiment.

A process executed upon image registration will be explained first. FIG. 26 is a flow chart showing the image registration process sequence according to the third embodiment. In step S211, an image is captured using the image input unit 12 in accordance with a user's instruction input via the user interface unit 11, and is held in the image memory 13. In step S212, this image is segmented into a plurality of blocks. In this embodiment, an image is segmented into a plurality of blocks in the vertical and horizontal directions. In the third embodiment as well, as has been described with reference to FIG. 5, an image is segmented into 3×3 blocks, i.e., a total of nine blocks for the sake of simplicity. In step S213, feature amounts of the segmented blocks are computed, and the obtained feature amounts are converted into labels in the following sequence.

Note that segmentation of an image into 3×3 blocks shown in FIG. 5 in this embodiment is merely for a descriptive purpose. In practice, in case of a natural image, the image is preferably segmented into 10×10 or more blocks. On the other hand, when an article is imaged on a white solid background, the image is preferably segmented into 13×13 or more blocks.

Also, feature amount labels used in this embodiment are obtained by segmenting a multi-dimensional feature amount space (RGB color space) into a plurality of blocks (color blocks), i.e., cells (color cells), and assigning unique labels to the respective cells (color cells) using serial numbers, as has been described with reference to FIG. 6. The reason why the multi-dimensional feature amount space (RGB color space) is segmented into a plurality of blocks is to absorb delicate feature amount (color) differences.

As for the multi-dimensional feature amount space, in place of directly using image feature amounts, the respective parameters may be normalized (standardized) by obtaining the average and variance by experiments, and after that, they may undergo orthogonal transformation such as principal component analysis or the like to be transformed into a significant dimension. Note that the "significant dimension" is defined by a principal component axis with a large contribution ratio.

In step S213, the individual blocks segmented in step S212 undergo a predetermined image feature amount computation to determine the cells on the multi-dimensional feature amount space to which these blocks belong, thus obtaining corresponding labels. This process is done for all the blocks. More specifically, a computation for determining color cells to which all pixels in a given segmented image block belong is made for that segmented image block, and the label of the color cell with the highest frequency is determined as a parameter label (color label) of that segmented image block. This process repeats itself for all the blocks.

After parameter labels are assigned to the individual blocks, histogram information of labels determined in all the segmented image blocks in a single image is obtained in step S214. Subsequently, in step S215, an image ID of the image data of interest is acquired, and the address to the image data of interest, the histogram information obtained in step S214, and the like are registered in the image management DB 18b, as shown in FIG. 25.

Furthermore, in step S216, the obtained information is reflected in the component index shown in FIG. 10, which stores, using labels as keys, pairs of image IDs including those labels and the numbers of labels included in the images. Whether or not information is reflected in the component index is determined in correspondence.with the number of labels included in the image of interest. For example, a predetermined threshold value is compared with the content of a given label to determine whether or not the information is reflected in the component index. In other words, the component index is updated for labels, the number of which exceeds the predetermined threshold value. Note that this threshold value is tuned as needed.

The process to be done upon image registration has been described.

Similar Image Search Process

Figure 27:
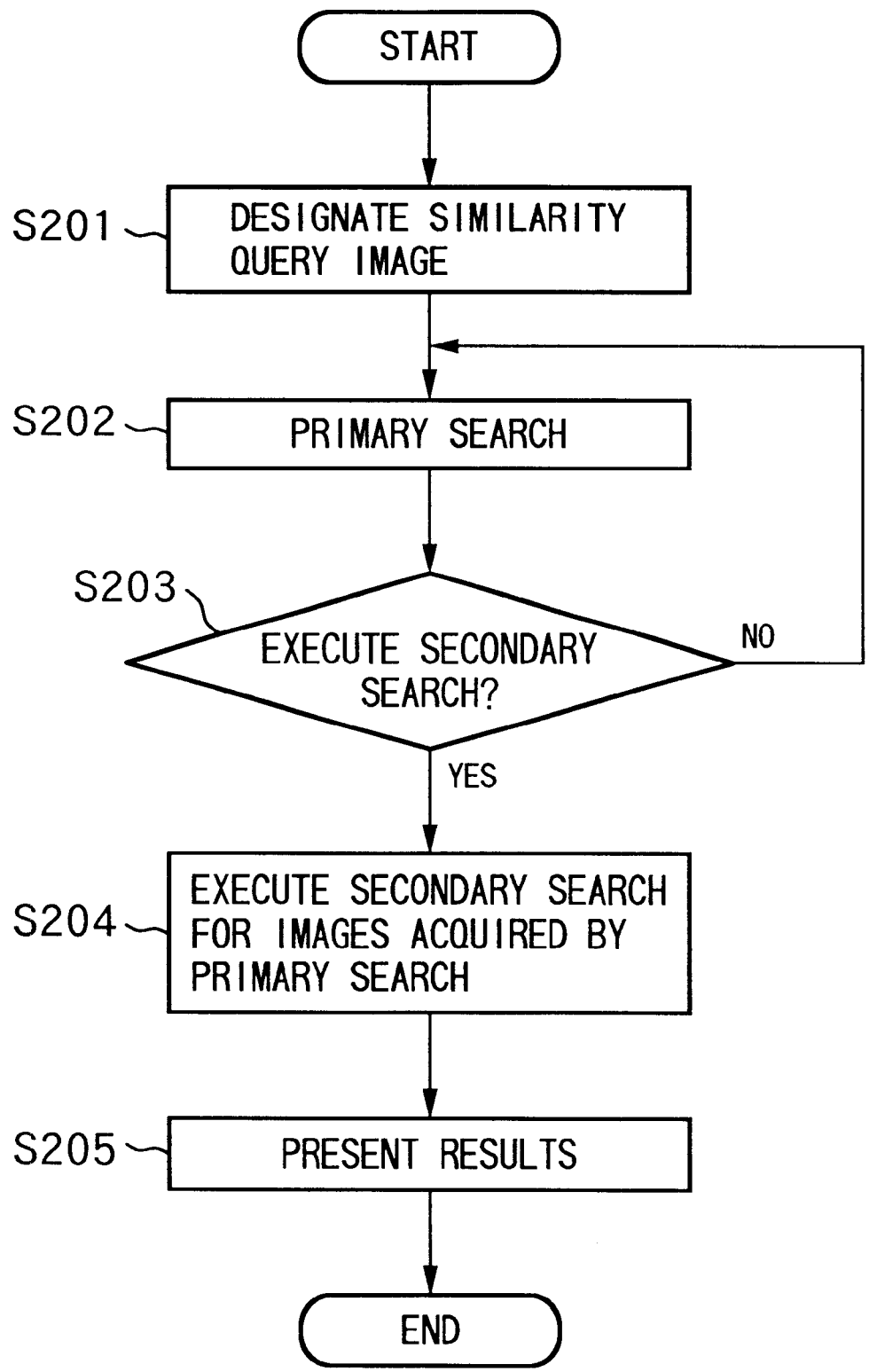
FIG. 27 is a flow chart for explaining the sequence of a similar image search process according to the third embodiment.

The similar image .search process according to the third embodiment will be explained below. FIG. 27 is a flow chart for explaining the similar image search process sequence according to the third embodiment.

If the user submits a similarity query image via the user interface unit 11 in step S201, a primary search (to be also referred to as presearch hereinafter) is done in step S202, and the search results are presented to the user via the user interface unit 11. Based on the presented search results, the user instructs whether or not a secondary search (to be also referred to as a main search hereinafter) is executed. If the user instructs to execute a secondary search, the flow advances from step S203 to step S204 to execute a secondary search with respect to images acquired by the primary search. In the third embodiment, the secondary search searches for similar images by making inner product computations of histograms. In step S205, images obtained by the secondary search in step S204 are presented. More specifically, full-path file names are obtained from the image management DB 18b using the image IDs finally acquired by the second search, and are presented to the user.

In the third embodiment, the primary search process (presearch) is executed. The major objective of this primary search is to reduce the processing load on the secondary search. When a similar image search is done for an image DB storing several ten thousand images, the user rarely checks all the images in descending order of similarity, and most of users are satisfied with at most several hundred images listed in descending order of similarity.

In the image search apparatus of the third embodiment, the upper limit of the search hit count target range is determined in consideration of the system processing performance and the maximum number of hits presented to the user. At the same time, the lower limit of the search hit count target range is set. For example, this value may be set to retrieve images that the user can check at a glance on a hit display window to prevent somewhat irrelevant search results from being presented to the user. In other words, the number of images which can be simultaneously displayed on the hit display window is set as the lower limit.

In the third embodiment, upon, e.g., system introduction, tests for determining the number of hits that can reduce the load on the secondary search process are run. If the number of hits is 300, the upper limit of the presearch target range is set to be relatively larger than 300, i.e., at 400. If the number of images that can be displayed on one page of the hit display window, the number of images that can be displayed on one page of the hit display window is set at 20 as the lower limit of the presearch target range upon system introduction.

Since the inner product computation of histograms is made in step S204 for only images selected by the presearch process, search results exploiting similarity can be obtained greatly faster than those obtained by directly making the inner product computation for all images by a conventional method.

Figure 28:
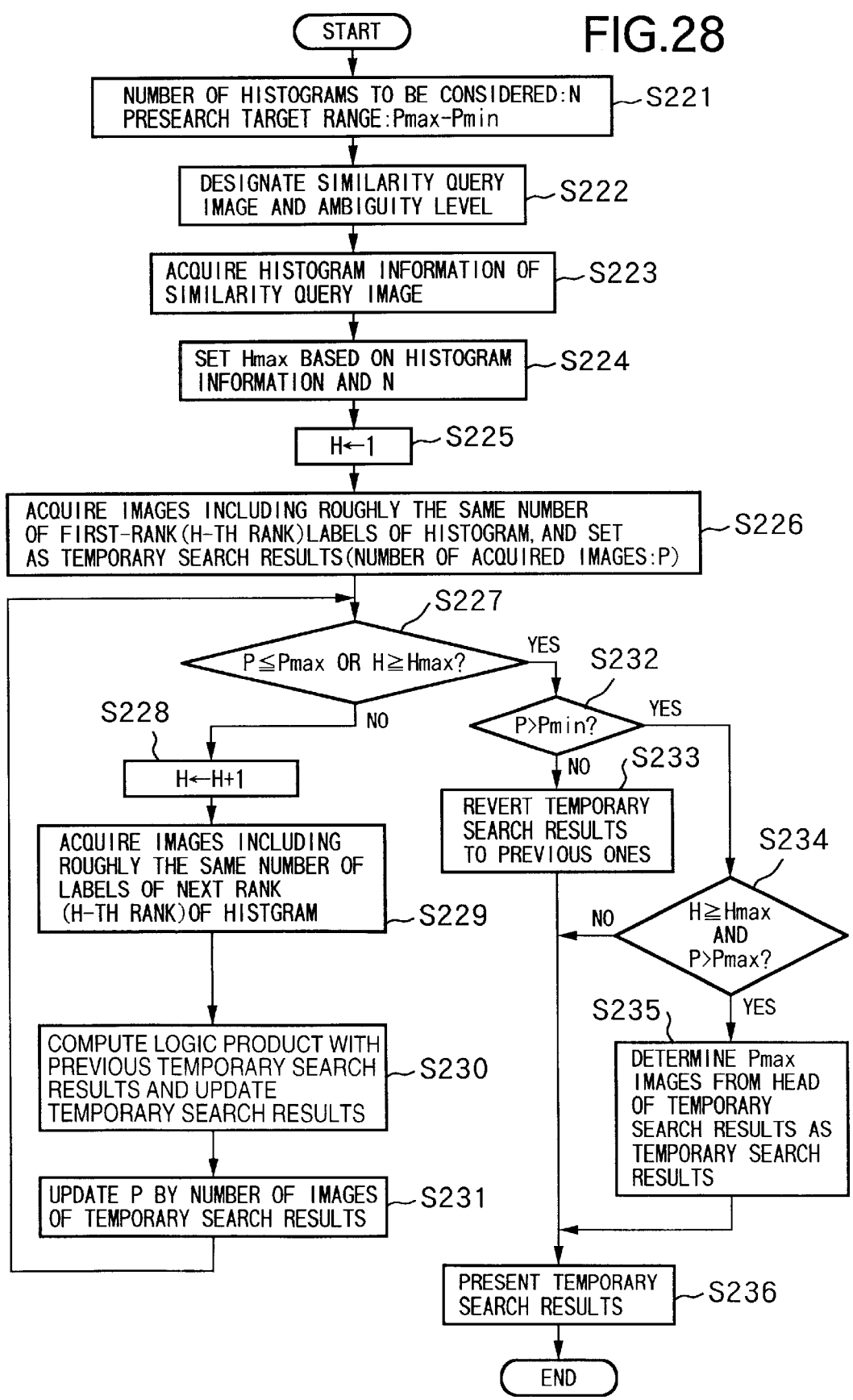
FIG. 28 is a flow chart showing the processing sequence of a presearch according to the third embodiment.

The presearch sequence according to this embodiment will be described in detail below with reference to FIGS. 28 and 29. FIG. 28 is a flow chart for explaining the overall presearch process sequence of this embodiment. FIG. 29 is a flow chart for explaining the image extraction sequence according to the ambiguity level in the presearch of this embodiment.

In step S221, the number N of histograms to be considered and the presearch target range (upper limit value Pmax, lower limit value Pmin) are acquired from the system storage area. Note that how to use the number N of histograms to be considered and the presearch target range will become apparent from the following description.

In step S222, an image that is to undergo a similarity search (to be referred to as a similarity query image hereinafter) is selected, and the ambiguity level of the similarity search is designated. In this embodiment, the similarity query image is selected from a group of images presented. However, since a similarity query image has already been designated in step S201 above, designation in this routine may be omitted. As for ambiguity of a search, a predetermined default value may be initially set, and may be desirably changed by the user.

When the user issues a search instruction, an image ID corresponding to the query image is acquired, and histogram information of the query image is obtained from the image management DB 18b in step S223. In step S224, a smaller one of the number of labels obtained from the acquired histogram information, and the number N of labels to be considered is set in Hmax. In step S225, H is set at 1.

With the processes in steps S221 to S225, variable H that indicates the histogram rank, the process of which is underway, the maximum number Hmax of labels to be considered in the presearch, the upper limit value Pmax of the number of images acquired by the presearch, and the lower limit value Pmin of the number of images acquired by the presearch are set.

In step S226, images which include roughly the same number of first-rank labels of the histogram information as that in the similarity query image are acquired with reference to the component index 19b (FIG. 10), acquired image IDs are registered in temporary search results, and the number of acquired images is set in P. Note that "roughly the same number" in this process varies depending on the set ambiguity level or the like. This will be explained later with reference to FIG. 29 that shows the details of the process in step S226.

As a result of the process in step S226, if the number P of acquired images is larger than the pre-set number Pmax of acquired images, processes in steps S228 to S231 are done to narrow down to fewer images.

In step S228, the histogram rank to be processed is lowered by one (H+1 is substituted in H). In step S229, images (image IDs) which include roughly the same number of labels corresponding to the next rank (H-th rank) in the histogram information as that in the similarity query image are acquired. In step S230, the image IDs included in the previous temporary search results, and the image IDs acquired in step S229 are ANDed, and the results are set as new temporary search results. In step S231, the number P of acquired images is updated by the number of image IDs included in the new temporary search results.

The "narrowing-down process" in steps S228 to S231 repeats itself until the number P of acquired images becomes equal to or smaller than Pmax or the number of labels processed (histogram rank H) reaches the maximum value Hmax of the number of labels to be considered (step S227).

If it is determined in step S227 that the number P of acquired images has become equal to or smaller than the target upper limit value Pmax or the histogram rank H of labels processed has become equal to or larger than Hmax, the flow advances to step S232. It is checked in step S232 if the number P of acquired images is larger than the target lower limit value Pmin. If the number P of acquired images is equal to or smaller than the target lower limit value, the flow advances to step S233, the temporary search results are reverted to the previous results (the narrowed-down results on the immediately higher histogram rank). In step S236, those temporary search results are presented. If H=1, since there are no "previous results", the control skips step S233.

On the other hand, if it is determined in step S232 that the number P of acquired images is larger than the target lower limit value Pmin, the flow advances to step S234. If it is determined in step S234 that the histogram rank H is equal to or larger than Hmax and the number P of acquired images is larger than the target upper limit value Pmax, the flow advances to step S235. Pmax image IDs are picked up from the head of the image IDs of the acquired temporary search results as new temporary search results in step S235, and are presented to the user in step S236. On the other hand, if NO is determined in step S234, since the number P of acquired images falls within the range Pmin<P<Pmax, the contents of the temporary search results are directly presented to the user.

To summarize, matching image IDs are acquired with reference to the component index 19b by the process in step S226, and if the number of acquired images is equal to or smaller than the upper limit value Pmax of the presearch target range, those image IDs are determined as temporary search results, and the processing ends. On the other hand, if the number of acquired images is larger than the upper limit value of the presearch target range, the same process as that described above repeats itself for labels on the next histogram rank, and new temporary search results and the previous temporary search results are ANDed to narrow them down to fewer images. As a result, if the number P of acquired images becomes equal to or smaller than the upper limit Pmax of the presearch target range and is larger than the lower limit Pmin of the presearch target range, those image IDs are determined as temporary search results and the processing ends. On the other hand, if the number P of acquired image IDs is smaller than the lower limit Pmin of the search target range, the previous results are reverted and this processing ends.

If the number P of acquired images is larger than the upper limit Pmax of the presearch target range, the aforementioned narrowing-down process recursively repeats itself a smaller one of the number of times determined in advance by Hmax and that given by the number of kinds of labels −1 of the query image. If the number P of acquired images is still larger than the upper limit Pmax of the target range when the histogram rank H has reached Hmax, image IDs corresponding to the upper limit Pmax of the presearch target range of the latest ANDed narrowed-down results are output as final results.

The image extraction process executed in steps S226 and S229 will be explained below with reference to the flow chart in FIG. 29.

In this image extraction process, the range of the number of labels is determined from the H-th-rank label of the histogram information on the basis of the number of labels included in the similarity query image, and images that include those labels within the determined range of the number of labels are searched with reference to the component index 19b.

In step S241, label K serving as a search key, the number of labels K (content F) included in the similarity query image, and ambiguity level are set. Note that label K serving as a search key is determined by the histogram rank H. In step S242, extraction results are cleared to prepare for the following extraction process.

It is checked in step S243 if an ambiguous search is done. If the ambiguity level designated by the user is a minimum value (or if the user cancels an ambiguous search), the flow advances to step S250, and the component index file is searched using only label K as a search key (steps S250 and S251). Otherwise, labels having penalty distances within the penalty range corresponding to the ambiguity level from label K are extracted, and images are extracted with reference to the component index also using the extracted labels (steps S244 to S249). These extraction results are ORed to implement an ambiguous search. Of course, as the ambiguity level is higher, labels with larger penalty distances are taken into consideration.

The processes in the ambiguous search will be explained in turn. In step S244, variable J for counting the number of times of processing is reset to 1. In step S245, labels which fall within the penalty value range corresponding to the ambiguity level with respect to label K are acquired with reference to the penalty matrix shown in FIG. 11 to generate a label group LABEL[n]. Note that the label group LABEL [n] includes label K. Let N be the number of labels included in LABEL[n] to express the individual labels by LABEL[1], . . . , LABEL[N]. For example, in the penalty matrix shown in FIG. 11, when the penalty value range is 4 or less with respect to label 3, LABEL[1]=3, LABEL[2]=5, LABEL[3]= 6, LABEL[4]=8, . . . are obtained.

If it is determined in step S246 that J<N, the flow advances to step S247, and image IDs of images which include LABEL[J] within the range from 0.5×F to 1.5×F are acquired. In this embodiment, in order to search for images having a ratio of similitude of 2×area ratio so as to attain a stable presearch even for enlarged/reduced images, the number of labels is set to range from 50% to 150% with respect to a fixed ratio for all labels, e.g., the frequency value (F) in the similarity query image, on the basis of tests that consider the above requirement. Note that the content range include the frequency value (F) in the similarity query image, and various methods of determining that range are available depending on the nature of a secondary search conducted in step S204. Hence, the present invention is not limited to the method explained in the embodiment. For example, as another method, each kind of label may undergo a statistical process to obtain the average and variance of frequencies per image, and the standard deviation of frequency values in the query image may be computed to set the range of the number of labels in correspondence with that deviation.

In step S248, the image IDs acquired in step S247 and those included in the extraction results obtained so far are ORed, and the results are determined as new extraction results. In step S249, the processing time counter J is incremented by 1, and the flow returns to step S246, thus repeating the processes in steps S247 and S248 for all the extracted labels LABEL[1] to LABEL[N]. Upon completion of the process for all the labels of the label group, the flow advances to step S252 to output the finally obtained extraction results and the number of images (the number of images is used as the number P of acquired images in step S226).

On the other hand, if an ambiguous search is not made, the flow advances to step S250 to extract image IDs of images that include label K within the range of 0.5 F to 1.5 F with reference to the component index 19b. The extracted image IDs are determined as extraction results in step S251, and are output together with the number of images in step S252. Note that "output" in step S252 is to pass data to the control program shown in FIG. 27.

To recapitulate, according to this embodiment, candidate images can be narrowed down to fewer images at high speed by executing a presearch using a component index file, prior to a similar image search process using inner product computations of histograms and the like. For this reason, the number of images can be reduced to a value the system can process, and improvement of search speed and a reduction of the system load can be achieved. Since a presearch can be done in consideration of the ambiguity level of a search designated by the user, narrowing down of candidate images to fewer images can be effectively done.

In the above embodiment, a natural image search has been exemplified. However, it is known to those who are skilled in the art that the present invention is applicable to an artificial image search such as CG images, CAD images, and the like.

In the above embodiment, color information is selected as an image feature amount. However, the present invention is not limited to such specific image feature amount, and can be practiced by obtaining other image parameters in units of blocks obtained by segmenting an image.

In the above embodiment, a search process based on the content in a histogram is used as a presearch. Also, such search process can be applied to a search using similarity. For example, in order to search for 100% matching images, a search can be done using the label content range upon referring to the component index 19b as the frequency of occurrence of the label of interest in the query image. The similarity is raised, and the upper and lower limits of the label content range are broadened in correspondence with the similarity to execute a process corresponding to the aforementioned presearch. Then, new results and previous results are ORed to accumulate results. In this way, by gradually raising the similarity and repeating the process, a search corresponding to given similarity can be done.

To restate, according to the present invention, a high-speed image search (or narrowing down), which is done prior to the inner product computation of a color histogram or replaces the inner product computation of a color histogram or the like, can be provided.

Also, according to the present invention, since a high-speed presearch is done using an index file, the number of images can be reduced to a value the system in question can process, thus improving the search speed.

Furthermore, according to the present invention, since images can be selected in consideration of ambiguity of a search designated by the user, candidate images can be narrowed down to fewer images effectively.

Note that the presearch explained in the third embodiment may be applied to acquisition of label sequences (label matrices) having a predetermined number or more of common labels, which is executed in step S24 or S24a, prior to the matching process in the first and second embodiments. Alternatively, the process such as DP matching or the like described in the first or second embodiment may be applied to the secondary search process (step S204) in the third embodiment.

Note that the present invention may be applied to either a system constituted by a plurality of equipments, or an apparatus consisting of a single equipment.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image search apparatus comprising:
   generation means for generating label information by segmenting image data into a plurality of blocks, and assigning labels in correspondence with feature amounts acquired in units of blocks;
   index means for readably holding, using each label included in the label information as a key, image data including that label and the number of labels included in the image data;

storage means for storing the label information in correspondence with the image data;

first extraction means for extracting image data having label information including at least a predetermined number of labels identical to or similar to labels included in label information of a query image, with reference to said index means and said storage means; and second extraction means for extracting similar image data by computing similarities between the image data extracted by said first extraction means, and the query image, wherein said generation means comprises assigning means for segmenting image data into a plurality of blocks, and assigning labels in correspondence with feature amounts acquired in units of labels, and generates a label sequence by arranging the labels assigned by said assigning means in a predetermined block order.

2. The apparatus according to claim 1, wherein the label information stored in said storage means is label sequence generated by said generation means, and said second extraction means extracts similar image data by computing similarities between label sequences stored in said storage means of the image data extracted by said first extraction means, and a label sequence of the query image.

3. The apparatus according to claim 1, wherein image data registered in units of labels of said index means are sorted and registered on the basis of the numbers of labels included in those images.

4. The apparatus according to claim 1, wherein said index means registers image IDs which specify image data including a label of interest in units of labels.

5. The apparatus according to claim 1, wherein the labels are unique labels assigned to cells obtained by segmenting a multi-dimensional feature amount space into a plurality of cells, and said assigning means computes a feature amount of each of the plurality of blocks, and assigns a label, assigned to the cell to which the computed feature amount belongs, to that block.

6. The apparatus according to claim 5, wherein the plurality of blocks are obtained by segmenting an image into a plurality of blocks in the vertical and horizontal directions, and the block order used in said generation means is an order for scanning the plurality of blocks obliquely.

7. The apparatus according to claim 5, wherein the plurality of blocks are obtained by segmenting an image into a plurality of blocks in the vertical and horizontal directions, and the block order used in said generation means is an order for scanning the plurality of blocks in the horizontal or vertical direction.

8. The apparatus according to claim 1, wherein said second extraction means comprises:

computation means for computing similarities between a label sequence of the query image and label sequences of image data extracted by said first extraction means; and output means for outputting image data, in which similarities computed by said computation means exceed a predetermined value, as search results.

9. The apparatus according to claim 8, wherein said computation means has a penalty table for holding penalty values in correspondence with pairs of label values, and computes the similarities between the label sequence of the query image data and the label sequences of the extracted image data on the basis of the penalty table.

10. The apparatus according to claim 9, wherein the labels are unique labels assigned to cells obtained by segmenting a multi-dimensional feature amount space into a plurality of cells, and each of the penalty values is set on the basis of a distance between the cells expressed by two labels.

11. The apparatus according to claim 9, wherein said computation means assigns a penalty value corresponding to overs/shorts of labels upon computing the similarity between a label sequence of a query image and an image to be compared.

12. The apparatus according to claim 11, wherein the penalty value corresponding to overs/shorts of the labels is acquired on the basis of a theory of automaton.

13. The apparatus according to claim 9, wherein said computation means computes the similarities by executing DP matching using the penalty values.

14. The apparatus according to claim 13, further comprising setting means for setting a width of a matching window of DP matching used in said computation means.

15. The apparatus according to claim 1, wherein the label sequence represents a two-dimensional label matrix that reflects positions of the plurality of blocks, and said second extraction means comprises:

first matching means for obtaining row sequences of image data extracted by said first extraction means by pairing label sequences in units of rows obtained from a label matrix of the query image data with label sequences in units of rows obtained from each of label matrices of the extracted image data by DP matching; and second matching means for obtaining similarities between a row sequence of the label sequence of the query image data and the row sequences obtained by said first matching means by DP matching.

16. The apparatus according to claim 15, wherein the label sequences in units of rows are sequences corresponding to a horizontal direction of an image.

17. The apparatus according to claim 15, wherein the label sequences in units of rows are sequences corresponding to a vertical direction of an image.

18. The apparatus according to claim 15, further comprising output means for outputting images, similarities obtained by said second matching means of which exceed a predetermined value, as search results.

19. The apparatus according to claim 15, wherein said first matching means has a penalty table for holding penalty values in correspondence with pairs of labels, and computes distances between the label sequence of the query image and the label sequences of the extracted images using DP matching with reference to the penalty table.

20. The apparatus according to claim 15, wherein said second matching means has an inter-row penalty table for holding penalty values in correspondence with pairs of row numbers in the row sequence, and computes similarities between the row sequence of the query image data and row sequences of the extracted image data using DP matching with reference to the inter-row penalty table.

21. The apparatus according to claim 20, further comprising holding means for determining penalty values that pertain to pairs of rows on the basis of similarities of label sequences of individual rows of the query image data, and holding the penalty values as the inter-row penalty table.

22. The apparatus according to claim 15, wherein said first matching means gives a penalty and constraint corresponding to elasticity of a label sequence to be compared upon computing similarities between the label sequence of the query image data and label sequences stored in said storage means.

23. The apparatus according to claim 22, wherein the penalty and constraint corresponding to elasticity of the label sequence to be compared are acquired on the basis of a theory of DP matching.

24. The apparatus according to claim 15, further comprising first setting means for setting a width of a matching window of DP matching used in said first matching means.

25. The apparatus according to claim 15, further comprising second setting means for setting a width of a matching window of DP matching used in said second matching means.

26. The apparatus according to claim 1, wherein said storage means stores label histogram information representing a histogram of labels assigned to the respective blocks of the image data by said generation means.

27. The apparatus according to claim 26, wherein said second extraction means makes a similar image search on the basis of an inner product of the label histogram information between images extracted by said first extraction means, and the query image.

28. The apparatus according to claim 26, further comprising setting means for setting as a search condition, a label to be retrieved and a content range thereof on the basis of the label histogram information of the query image, and
wherein said first extraction means extracts images with reference to said index means under the search condition set by said setting means.

29. The apparatus according to claim 28, wherein said setting means sets only a label included in the query image as the label to be retrieved.

30. The apparatus according to claim 28, wherein said setting means sets as the label to be retrieved a label included in the query image, and a similar label, in which a penalty value with respect to that label is not more than a predetermined value.

31. The apparatus according to claim 30, wherein said first extraction means extracts images which include at least one of the labels to be retrieved set by said setting means within the content range.

32. The apparatus according to claim 30, wherein the penalty value is set in correspondence with a desirably set ambiguity level.

33. The apparatus according to claim 28, wherein said setting means sets as the content range a range defined by values respectively obtained by multiplying the number of labels to be retrieved included in the query image by first and second predetermined values.

34. The apparatus according to claim 28, further comprising control means for, when said first extraction means extracts images, the number of which exceeds a predetermined upper limit value, controlling said setting means and said first extraction means to repeat operations using another label in the query image.

35. The apparatus according to claim 34, wherein said control means selects a label to be used in turn from higher-rank labels in the label histogram information of the similarity search image.

36. An image search method comprising:
the generation step of generating label information by segmenting image data into a plurality of blocks, and assigning labels in correspondence with feature amounts acquired in units of blocks;
the step of providing index means for readably holding, using each label included in the label information as a key, image data including that label and the number of labels included in the image data;
the storage step of storing the label information in storage means in correspondence with the image data;
the first extraction step of extracting image data having label information including at least a predetermined number of labels identical to or similar to labels included in label information of a query image, with reference to the index means and the storage means; and
the second extraction step of extracting similar image data by computing similarities between the image data extracted in the first extraction step, and the query image,
wherein the generation step comprises the assigning step of segmenting image data into a plurality of blocks, and assigning labels in correspondence with feature amounts acquired in units of labels, and includes the step of generating a label sequence by arranging the labels assigned in the assigning step in a predetermined block order.

37. The method according to claim 36, wherein the label information stored in said storage means is a label sequence generated in the generation step, and
the second extraction step includes the step of extracting similar image data by computing similarities between label sequences stored in said storage means of the image data extracted in the first extraction step, and a label sequence of the query image.

38. The method according to claim 36, wherein image data registered in units of labels of said index means are sorted and registered on the basis of the numbers of labels included in those images.

39. The method according to claim 36, wherein said index means registers image IDs which specify image data including a label of interest in units of labels.

40. The method according to claim 36, wherein the labels are unique labels assigned to cells obtained by segmenting a multi-dimensional feature amount space into a plurality of cells, and
the assigning step includes the step of computing a feature amount of each of the plurality of blocks, and assigning a label, assigned to the cell to which the computed feature amount belongs, to that block.

41. The method according to claim 40, wherein the plurality of blocks are obtained by segmenting an image into a plurality of blocks in the vertical and horizontal directions, and the block order used in the generation step is an order for scanning the plurality of blocks obliquely.

42. The method according to claim 40, wherein the plurality of blocks are obtained by segmenting an image into a plurality of blocks in the vertical and horizontal directions, and the block order used in the generation step is an order for scanning the plurality of blocks in the horizontal or vertical direction.

43. The method according to claim 36, wherein the second extraction step comprises:
the computation step of computing similarities between a label sequence of the query image and label sequences of image data extracted in the first extraction step; and
the output step of outputting image data, in which similarities computed in the computation step exceed a predetermined value, as search results.

44. The method according to claim 43, wherein the computation step has a penalty table for holding penalty values in correspondence with pairs of label values, and includes the step of computing the similarities between the label sequence of the query image data and the label sequences of the extracted image data on the basis of the penalty table.

45. The method according to claim 44, wherein the labels are unique labels assigned to cells obtained by segmenting a multi-dimensional feature amount space into a plurality of cells, and each of the penalty values is set on the basis of a distance between the cells expressed by two labels.

46. The method according to claim 44, wherein the computation step includes the step of assigning a penalty value corresponding to overs/shorts of labels upon computing the similarity between a label sequence of a query image and an image to be compared.

47. The method according to claim 46, wherein the penalty value corresponding to overs/shorts of the labels is acquired on the basis of a theory of automaton.

48. The method according to claim 44, wherein the computation step includes the step of computing the similarities by executing DP matching using the penalty values.

49. The method according to claim 48, further comprising the setting step of setting a width of a matching window of DP matching used in the computation step.

50. The method according to claim 36, wherein the label sequence represents a two-dimensional label matrix that reflects positions of the plurality of blocks, and the second extraction step comprises:

the first matching step of obtaining row sequences of image data extracted in the first extraction step by pairing label sequences in units of rows obtained from a label matrix of the query image data with label sequences in units of rows obtained from each of label matrices of the extracted image data by DP matching; and the second matching step of obtaining similarities between a row sequence of the label sequence of the query image data and the row sequences obtained in the first matching step by DP matching.

51. The method according to claim 50, wherein the label sequences in units of rows are sequences corresponding to a horizontal direction of an image.

52. The method according to claim 50, wherein the label sequences in units of rows are sequences corresponding to a vertical direction of an image.

53. The method according to claim 50, further comprising the output step of outputting images, similarities obtained by said second matching means of which exceed a predetermined value, as search results.

54. The method according to claim 50, wherein the first matching step has a penalty table for holding penalty values in correspondence with pairs of labels, and includes the step of computing distances between the label sequence of the query image and the label sequences of the extracted images using DP matching with reference to the penalty table.

55. The method according to claim 50, wherein the second matching step has an inter-row penalty table for holding penalty values in correspondence with pairs of row numbers in the row sequence, and includes the step of computing similarities between the row sequence of the query image data and row sequences of the extracted image data using DP matching with reference to the inter-row penalty table.

56. The method according to claim 55, further comprising the holding step of determining penalty values that pertain to pairs of rows on the basis of similarities of label sequences of respective rows of the query image data, and holding the penalty values as the inter-row penalty table.

57. The method according to claim 50, wherein the first matching step includes the step of giving a penalty and constraint corresponding to elasticity of a label sequence to be compared upon computing similarities between the label sequence of the query image data and label sequences stored in said storage means.

58. The method according to claim 57, wherein the penalty and constraint corresponding to elasticity of the label sequence to be compared are acquired on the basis of a theory of DP matching.

59. The method according to claim 50, further comprising the first setting step of setting a width of a matching window of DP matching used in the first matching step.

60. The method according to claim 50, further comprising the second setting step of setting a width of a matching window of DP matching used in the second matching step.

61. The method according to claim 36, wherein said storage means stores label histogram information representing a histogram of labels assigned to the respective blocks of the image data in the generation step.

62. The method according to claim 61, wherein the second extraction step includes the step of making a similar image search on the basis of an inner product of the label histogram information between images extracted in the first extraction step, and the query image.

63. The method according to claim 61, further comprising the setting step of setting as a search condition, a label to be retrieved and a content range thereof on the basis of the label histogram information of the query image, and wherein the first extraction step includes the step of extracting images with reference to said index means under the search condition set in the setting step.

64. The method according to claim 63, wherein the setting step includes the step of setting only a label included in the query image as the label to be retrieved.

65. The method according to claim 63, wherein the setting step includes the step of setting as the label to be retrieved a label included in the query image, and a similar label, in which a penalty value with respect to that label is not more than a predetermined value.

66. The method according to claim 65, wherein the first extraction step includes the step of extracting images which includes at least one of the labels to be retrieved set in the setting step within the content range.

67. The method according to claim 65, wherein the penalty value is set in correspondence with a desirably set ambiguity level.

68. The method according to claim 63, wherein the setting step includes the step of setting as the content range a range defined by values respectively obtained by multiplying the number of labels to be retrieved included in the query image by first and second predetermined values.

69. The method according to claim 63, further comprising the control step of controlling the setting step and the first extraction step to repeat operations using another label in the query image, when images, the number of which exceeds a predetermined upper limit value, are extracted in the first extraction step.

70. The method according to claim 69, wherein the control step includes the step of selecting a label to be used in turn from higher-rank labels in the label histogram information of the similarity search image.

71. A storage medium that stores a control program for making a computer implement an image search process, said control program comprising:

a program code of the generation step of generating label information by segmenting image data into a plurality of blocks, and assigning labels in correspondence with feature amounts acquired in units of blocks;

a program code of the step of providing index means for readably holding, using each label included in the label information as a key, image data including that label and the number of labels included in the image data;

a program code of the storage step of storing the label information in storage means in correspondence with the image data;

a program code of the first extraction step of extracting image data having label information including at least a predetermined number of labels identical to or similar to labels included in label information of a query image, with reference to the index means and the storage means; and a program code of the second extraction step of extracting similar image data by computing similarities between the image data extracted in the first extraction step, and the query image, wherein the generation step comprises the assigning step of segmenting image data into a plurality of blocks, and assigning labels in correspondence with feature amounts acquired in units of labels, and includes the step of generating a label sequence by arranging the labels assigned in the assigning step in a predetermined block order.

72. A control program for making a computer implement an image search process, said control program comprising:

a program code of a generation step of generating label information by segmenting image data into a plurality of blocks, and assigning labels in correspondence with feature amounts acquired in units of blocks;

a program code of a step of providing index means for readably holding, using each label included in the label information as a key, image data including that label and the number of labels included in the image data;

a program code of a storage step of storing the label information in storage means in correspondence with the image data;

a program code of a first extraction step of extracting image data having label information including at least a predetermined number of labels identical to or similar to labels included in label information of a query image, with reference to the index means and the storage means; and a program code of a second extraction step of extracting similar image data by computing similarities between the image data extracted in the first extraction step, and the query image, wherein the generation step comprises the assigning step of segmenting image data into a plurality of blocks, and assigning labels in correspondence with feature amounts acquired in units of labels, and includes the step of generating a label sequence by arranging the labels assigned in the assigning step in a predetermined block order.

* * * * *

UNITED STATES PATENT AND TRADEMARK OFFICE
CERTIFICATE OF CORRECTION

PATENT NO. : 6,584,223 B1
DATED : June 24, 2003
INVENTOR(S) : Hirotaka Shiyama

It is certified that error appears in the above-identified patent and that said Letters Patent is hereby corrected as shown below:

Column 8,
Line 62, "labels-that" should read -- labels that --.

Column 11,
Line 22, "use" should read -- uses --; and
Line 25, "step 115a," should read -- step 15a, --.

Column 12,
Line 7, "image" should read -- images --.

Column 13,
Line 63, "S11)," should read -- S111), --.

Column 15,
Line 13, "effective" should read -- effectively --.

Column 20,
Line 13, "window," should read -- window is 20, --; and
Line 14, "window is set at 20" should read -- window, 20, is set --.

Column 21,
Line 48, "Pmin<P<Pmax," should read -- $P_{min} \leqq P \leqq P_{max}$, --.

Column 23,
Line 1, "include" should read -- includes --.

UNITED STATES PATENT AND TRADEMARK OFFICE
CERTIFICATE OF CORRECTION

PATENT NO. : 6,584,223 B1
DATED : June 24, 2003
INVENTOR(S) : Hirotaka Shiyama

It is certified that error appears in the above-identified patent and that said Letters Patent is hereby corrected as shown below:

<u>Column 30,</u>
Line 42, "includes" should read -- include --.

Signed and Sealed this

Thirteenth Day of January, 2004

JON W. DUDAS
*Acting Director of the United States Patent and Trademark Office*